United States Patent
Kawai et al.

(10) Patent No.: US 7,024,657 B2
(45) Date of Patent: Apr. 4, 2006

(54) PROGRAM GENERATION APPARATUS FOR PROGRAM EXECUTION SYSTEM, REPLACES VARIABLE NAME IN EACH CLASS FILE BY ASSIGNED OFFSET NUMBER SO THAT SAME OFFSET NUMBERS ARE ASSIGNED TO NON-DEPENDENT VARIABLES WITH SAME VARIABLE NAME

(75) Inventors: Masaki Kawai, Ichinomiya (JP); Takuji Kawamoto, Nagoya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 530 days.

(21) Appl. No.: 09/789,021

(22) Filed: Feb. 20, 2001

(65) Prior Publication Data

US 2004/0205710 A1 Oct. 14, 2004

(30) Foreign Application Priority Data

Feb. 21, 2000 (JP) ............................. 2000-043499

(51) Int. Cl.
*G06F 9/44* (2006.01)

(52) U.S. Cl. .................. 717/116; 717/146; 717/166; 719/315

(58) Field of Classification Search ................ 717/106, 717/103, 108, 114–119, 124–143, 162–167, 717/100, 2, 148, 104, 111, 146; 700/34, 700/200; 707/102–103 R; 345/750; 719/315
See application file for complete search history.

(56) References Cited

U.S. PATENT DOCUMENTS

| | | | | |
|---|---|---|---|---|
| 5,361,350 A | * | 11/1994 | Conner et al. .......... 707/103 R |
| 5,367,685 A | * | 11/1994 | Gosling ...................... 717/148 |
| 5,390,328 A | * | 2/1995 | Frey et al. .................. 719/315 |
| 5,421,016 A | * | 5/1995 | Conner et al. ............. 717/146 |
| 5,586,326 A | * | 12/1996 | Ryu et al. ................... 717/104 |
| 5,613,120 A | * | 3/1997 | Palay et al. ................ 717/165 |
| 5,617,564 A | * | 4/1997 | Tomotake ................... 707/200 |
| 5,675,801 A | * | 10/1997 | Lindsey ..................... 717/108 |
| 5,692,195 A | * | 11/1997 | Conner et al. ............. 719/316 |
| 5,754,858 A | * | 5/1998 | Broman et al. ............ 717/111 |

(Continued)

FOREIGN PATENT DOCUMENTS

EP 9 65921 12/1999

(Continued)

OTHER PUBLICATIONS

Tim Ritchey, JAVA!, Sep. 22, 1995.*

(Continued)

*Primary Examiner*—Wei Y. Zhen
*Assistant Examiner*—Satish S. Rampuria

(57) ABSTRACT

A program generation apparatus for generating light-weight class files for each terminal apparatus by linking class files. The program generation apparatus includes: a storage unit for prestoring the class files for each terminal apparatus, where each class defines (a) dependent variables unique to each terminal apparatus and (b) non-dependent variables common to all the terminal apparatuses, each variable is identified by a variable name, and each class file includes a variable name for each variable; an assignment unit for assigning an offset number to each variable defined in the class files so that the same offset numbers are assigned to non-dependent variables having the same variable names; and a generation unit for generating the light-weight class files for each terminal apparatus by replacing each variable name in each class file with an offset number assigned by the assignment unit.

17 Claims, 51 Drawing Sheets

U.S. PATENT DOCUMENTS

| | | | | |
|---|---|---|---|---|
| 5,794,044 | A * | 8/1998 | Yellin | 717/139 |
| 5,966,542 | A * | 10/1999 | Tock | 717/166 |
| 5,987,256 | A * | 11/1999 | Wu et al. | 717/146 |
| 6,025,836 | A * | 2/2000 | McBride | 345/750 |
| 6,026,237 | A * | 2/2000 | Berry et al. | 717/130 |
| 6,061,520 | A * | 5/2000 | Yellin et al. | 717/148 |
| 6,066,181 | A * | 5/2000 | DeMaster | 717/148 |
| 6,093,216 | A * | 7/2000 | Adl-Tabatabai et al. | 717/128 |
| 6,321,377 | B1 * | 11/2001 | Beadle et al. | 717/148 |
| 6,324,688 | B1 * | 11/2001 | Brown et al. | 717/148 |
| 6,378,003 | B1 * | 4/2002 | Danforth | 719/316 |
| 6,442,558 | B1 * | 8/2002 | Brown et al. | 707/102 |
| 6,523,171 | B1 * | 2/2003 | Dupuy et al. | 717/136 |
| 6,578,191 | B1 * | 6/2003 | Boehme et al. | 717/107 |
| 6,754,887 | B1 * | 6/2004 | Gil et al. | 717/116 |
| 2002/0007482 | A1 * | 1/2002 | Cirne | 717/2 |
| 2004/0187094 | A1 * | 9/2004 | Gil et al. | 717/116 |

FOREIGN PATENT DOCUMENTS

| | | | |
|---|---|---|---|
| JP | 2000 122859 | | 4/2000 |
| JP | 2000 132424 | | 5/2000 |

OTHER PUBLICATIONS

Andy Krumel, Revolutionary RMI: Dynamic class loading and behavior objects; Find outh how RMI cand help you define extensible, distributed object-oriented frameworks, Dec. 1, 1998, Javaworld, p. 1.*

Allen Holub, Modifying archives, Part 2: The Achive class; The Archive class allows you to write or modify stored archive files, Oct. 30, 2000, Javaworld, p. 1.*

Horton's Ivor, Beginning Visual C++ 5, Mar. 19, 1997, Wrox Pr Inc, p. 270, 271, 285.*

C. Ramesh, Business Line: India: Netting a chatch, Nov. 15, 2000, Businessline, p. 1.*

Maruyama et al., A new class generation mechanism by method integration, IEEE, Jun. 2-5, 1998 Page(s): 196-205.*

Wong et al., An automatic software generation approach for easier distributed programming, IEEE, vol. 2, Oct. 14-17, 1996 Page(s): 1553-1558.*

Liu, A program generator for object-based implementation of communication protocol software, IEEE, Mar. 21-23, 1999 Page(s):384-387.*

* cited by examiner

FIG. 1

```
class Built_in_classX
{
  int           fieldX1;
  byte          fieldX2;
  private short    privateX1;
  private int      privateX2;
  private byte     privateX3;
} class Built_in_classY extends Built_in_classX
{
  Object        fieldY1;
  int           fieldY2;
  short         fieldY3;
  private char     privateY1;
  private long     privateY2;
}
```

FIG. 2

```
class Built_in_classX
{
  int          fieldX1;
  byte         fieldX2;
  private short    privateX1;
} class Built_in_classY extends Built_in_classX
{
  Object       fieldY1;
  int          fieldY2;
  short        fieldY3;
  private char     privateY1;
  private long     privateY2;
  private float    privateY3;
}
```

FIG. 3

```
class User_class extends Built_in_classY
{
   int          fieldU1;
   Object       fieldU2;
}
```

FIG. 4

INSTANCE FIELD OFFSET TABLE FOR Built_in_classX

| FIELD OFFSET | INSTANCE FIELD |
|---|---|
| 1 | fieldX1 |
| 2 | fieldX2 |
| 3 | privateX1 |
| 4 | privateX2 |
| 5 | privateX3 |

INSTANCE FIELD OFFSET TABLE FOR Built_in_classY

| FIELD OFFSET | INSTANCE FIELD |
|---|---|
| 1 | fieldX1 |
| 2 | fieldX2 |
| 3 | privateX1 |
| 4 | privateX2 |
| 5 | privateX3 |
| 6 | fieldY1 |
| 7 | fieldY2 |
| 8 | fieldY3 |
| 9 | privateY1 |
| 10 | privateY2 |

FIG. 5

INSTANCE FIELD OFFSET TABLE FOR Built_in_classX

| FIELD OFFSET | INSTANCE FIELD |
|---|---|
| 1 | fieldX1 |
| 2 | fieldX2 |
| 3 | privateX1 |

INSTANCE FIELD OFFSET TABLE FOR Built_in_classY

| FIELD OFFSET | INSTANCE FIELD |
|---|---|
| 1 | fieldX1 |
| 2 | fieldX2 |
| 3 | privateX1 |
| 4 | fieldY1 |
| 5 | fieldY2 |
| 6 | fieldY3 |
| 7 | privateY1 |
| 8 | privateY2 |
| 9 | privateY3 |

FIG. 6

INSTANCE FIELD OFFSET
TABLE FOR User_class

| FIELD OFFSET | INSTANCE FIELD |
|---|---|
| 1 | fieldX1 |
| 2 | fieldX2 |
| 3 | privateX1 |
| 4 | privateX2 |
| 5 | privateX3 |
| 6 | fieldY1 |
| 7 | fieldY2 |
| 8 | fieldY3 |
| 9 | privateY1 |
| 10 | privateY2 |
| 11 | fieldU1 |
| 12 | fieldU2 |

FIG. 7

INSTANCE FIELD OFFSET
TABLE FOR User_class

| FIELD OFFSET | INSTANCE FIELD |
|---|---|
| 1 | fieldX1 |
| 2 | fieldX2 |
| 3 | privateX1 |
| 4 | fieldY1 |
| 5 | fieldY2 |
| 6 | fieldY3 |
| 7 | privateY1 |
| 8 | privateY2 |
| 9 | privateY3 |
| 10 | fieldU1 |
| 11 | fieldU2 |

FIG. 11

CLASS-DESIGN-NON-DEPENDENT FIELD OFFSET TABLE FOR Built_in_classX

| FIELD OFFSET | INSTANCE FIELD |
|---|---|
| 1 | null |
| 2 | fieldX1 |
| 3 | fieldX2 |

CLASS-DESIGN-NON-DEPENDENT FIELD OFFSET TABLE FOR Built_in_classY

| FIELD OFFSET | INSTANCE FIELD |
|---|---|
| 1 | null |
| 2 | fieldX1 |
| 3 | fieldX2 |
| 4 | null |
| 5 | fieldY1 |
| 6 | fieldY2 |
| 7 | fieldY3 |

FIG. 12A

FOR TERMINAL APPARATUS A

CLASS-DESIGN-DEPENDENT FIELD
OFFSET TABLE FOR Built_in_classX

| FIELD OFFSET | INSTANCE FIELD |
|---|---|
| 1 | privateX1 |
| 2 | privateX2 |
| 3 | privateX3 |

CLASS-DESIGN-DEPENDENT FIELD
OFFSET TABLE FOR Built_in_classY

| FIELD OFFSET | INSTANCE FIELD |
|---|---|
| 1 | privateY1 |
| 2 | privateY2 |

FIG. 12B

FOR TERMINAL APPARATUS B

CLASS-DESIGN-DEPENDENT FIELD
OFFSET TABLE FOR Built_in_classX

| FIELD OFFSET | INSTANCE FIELD |
|---|---|
| 1 | privateX1 |

CLASS-DESIGN-DEPENDENT FIELD
OFFSET TABLE FOR Built_in_classY

| FIELD OFFSET | INSTANCE FIELD |
|---|---|
| 2 | privateY1 |
| 3 | privateY2 |
| 4 | privateY3 |

FIG. 13

CLASS-DESIGN-NON-DEPENDENT FIELD
OFFSET TABLE FOR User_class

| FIELD OFFSET | INSTANCE FIELD |
|---|---|
| 1 | null |
| 2 | fieldX1 |
| 3 | fieldX2 |
| 4 | null |
| 5 | fieldY1 |
| 6 | fieldY2 |
| 7 | fieldY3 |
| 8 | fieldU1 |
| 9 | fieldU2 |

FIG. 16A

BEFORE CONVERSION

```
Method void bar ()
    .
    .
    new <User_class>
    .
    .
    putfield <User_class.fieldU1>
    .
    .
    getfield <User_class.fieldU2>
    .
    .
    return
```

FIG. 16B

AFTER CONVERSION

```
Method void bar ()
    .
    .
    new 8001
    .
    .
    putfield 8
    .
    .
    getfield 9
    .
    .
    return
```

FIG. 17

```
classA
{
    int    fieldA1;//(4byte)
    short  fieldA2;//(2byte)
    byte   fieldA3;//(1byte)
    private int fieldA4;
}
```

FIG. 19A

BEFORE CONVERSION

Built_in_classY
 Method void foo ()
  . . .
  new <Built_in_classY>
  . . .
  putfield <Built_in_classY.fieldY1>
  . . .
  putfield <Built_in_classY.privateY1>
  . . .

FIG. 19B

AFTER CONVERSION

Built_in_classY
 Method void foo ()
  . . .
  new 2
  . . .
  putfield 5
  . . .
  dependent putfield 4 2
  . . .

FIG. 20

BASE CLASS ID CORRESPONDENCE TABLE

| CLASS NAME | CLASS ID |
|---|---|
| Built_in_classX | 1 |
| Built_in_classY | 2 |

FIG. 21

USER CLASS ID CORRESPONDENCE TABLE

| CLASS NAME | CLASS ID |
|---|---|
| User_class | 8001 |

FIG. 22

CLASS-DESIGN-NON-DEPENDENT FIELD COUNT TABLE
CORRESPONDING TO LIGHT-WEIGHT BASE CLASS FILE
COMMON TO TERMINAL APPARATUS A AND B

| CLASS ID | NON-DEPENDENT FIELD COUNT | SUPER CLASS ID |
|---|---|---|
| 1 | 3 | 0 |
| 2 | 7 | 1 |

FIG. 23

CLASS-DESIGN-NON-DEPENDENT FIELD COUNT TABLE
CORRESPONDING TO LIGHT-WEIGHT USER CLASS FILE
COMMON TO TERMINAL APPARATUS A AND B

| CLASS ID | NON-DEPENDENT FIELD COUNT | SUPER CLASS ID |
|---|---|---|
| 8001 | 9 | 2 |

FIG. 24A

CLASS-DESIGN-DEPENDENT FIELD COUNT TABLE
CORRESPONDING TO LIGHT-WEIGHT BASE CLASS FILE
OF TERMINAL APPARATUS A

| CLASS ID | NON-DEPENDENT FIELD OFFSET | DEPENDENT FIELD COUNT | SUPER CLASS ID |
|---|---|---|---|
| 1 | 1 | 3 | 0 |
| 2 | 4 | 2 | 1 |

FIG. 24B

CLASS-DESIGN-DEPENDENT FIELD COUNT TABLE
CORRESPONDING TO LIGHT-WEIGHT BASE CLASS FILE
OF TERMINAL APPARATUS B

| CLASS ID | NON-DEPENDENT FIELD OFFSET | DEPENDENT FIELD COUNT | SUPER CLASS ID |
|---|---|---|---|
| 1 | 1 | 1 | 0 |
| 2 | 4 | 3 | 1 |

FIG. 33

```
classA
{
    int   fieldA1;//(4byte)
    short fieldA2;//(2byte)
    byte  fieldA3;//(1byte)
}
```

FIG. 35

```
classA
{
    byte   fieldA1;//(4byte)
    short fieldA2;//(2byte)
} classB extendsA
{
    int   fieldB1;//(4byte)
}
```

FIG. 37

CLASS-DESIGN-NON-DEPENDENT FIELD
OFFSET TABLE FOR Built_in_classX

| FIELD OFFSET | INSTANCE FIELD |
|---|---|
| 1 | null |
| 2 | fieldX1 |
| 3 | fieldX2 |

CLASS-DESIGN-NON-DEPENDENT FIELD
OFFSET TABLE FOR Built_in_classY

| FIELD OFFSET | INSTANCE FIELD |
|---|---|
| 1 | null |
| 2 | fieldX1 |
| 3 | fieldX2 |
| 4 | fieldY1 |
| 5 | fieldY2 |
| 6 | fieldY3 |

FIG. 38A

FOR TERMINAL APPARATUS A

CLASS-DESIGN-DEPENDENT FIELD
OFFSET TABLE FOR Built_in_classX

| FIELD OFFSET | INSTANCE FIELD |
|---|---|
| 1 | privateX1 |
| 2 | privateX2 |
| 3 | privateX3 |

CLASS-DESIGN-DEPENDENT FIELD
OFFSET TABLE FOR Built_in_classY

| FIELD OFFSET | INSTANCE FIELD |
|---|---|
| 1 | privateX1 |
| 2 | privateX2 |
| 3 | privateX3 |
| 4 | privateY1 |
| 5 | privateY2 |

FIG. 38B

FOR TERMINAL APPARATUS B

CLASS-DESIGN-DEPENDENT FIELD
OFFSET TABLE FOR Built_in_classX

| FIELD OFFSET | INSTANCE FIELD |
|---|---|
| 1 | privateX1 |

CLASS-DESIGN-DEPENDENT FIELD
OFFSET TABLE FOR Built_in_classY

| FIELD OFFSET | INSTANCE FIELD |
|---|---|
| 1 | privateX1 |
| 2 | privateY1 |
| 3 | privateY2 |
| 4 | privateY3 |

FIG. 39

CLASS-DESIGN-NON-DEPENDENT FIELD
OFFSET TABLE FOR User_class

| FIELD OFFSET | INSTANCE FIELD |
|---|---|
| 1 | null |
| 2 | fieldX1 |
| 3 | fieldX2 |
| 4 | fieldY1 |
| 5 | fieldY2 |
| 6 | fieldY3 |
| 7 | fieldU1 |
| 8 | fieldU2 |

INSTANCE FOR User_class
FOR TERMINAL APPARATUS A

INSTANCE FOR User_class
FOR TERMINAL APPARATUS B

FIG. 41

CLASS-DESIGN-NON-DEPENDENT FIELD COUNT TABLE CORRESPONDING TO LIGHT-WEIGHT BASE CLASS FILE COMMON TO TERMINAL APPARATUSES A AND B

| CLASS ID | NON-DEPENDENT FIELD COUNT | SUPER CLASS ID |
|---|---|---|
| 1 | 2 | 0 |
| 2 | 5 | 1 |

FIG. 42A

CLASS-DESIGN-DEPENDENT FIELD COUNT TABLE CORRESPONDING TO LIGHT-WEIGHT BASE CLASS FILE FOR TERMINAL APPARATUS A

| CLASS ID | DEPENDENT FIELD COUNT |
|---|---|
| 1 | 3 |
| 2 | 5 |

FIG. 42B

CLASS-DESIGN-DEPENDENT FIELD COUNT TABLE CORRESPONDING TO LIGHT-WEIGHT BASE CLASS FILE FOR TERMINAL APPARATUS B

| CLASS ID | DEPENDENT FIELD COUNT |
|---|---|
| 1 | 1 |
| 2 | 4 |

FIG. 43

CLASS-DESIGN-NON-DEPENDENT FIELD COUNT TABLE CORRESPONDING TO LIGHT-WEIGHT USER CLASS FILE COMMON TO TERMINAL APPARATUSES A AND B

| CLASS ID | NON-DEPENDENT FIELD COUNT | SUPER CLASS ID |
|---|---|---|
| 8001 | 8 | 2 |

FIG. 44A

BEFORE CONVERSION

⋮
new 〈Built_in_classY〉
⋮
putfield 〈Built_in_classY.fieldY1〉
⋮
putfield 〈Built_in_classY.pricateY1〉
⋮

FIG. 44B

AFTER CONVERSION

⋮
new 2
⋮
putfield 4
⋮
dependent putfield 4
⋮

FIG. 45A

BEFORE CONVERSION

```
   :
   :
new 〈User_class〉
   :
   :
putfield 〈User_class.fieldU1〉
   :
   :
```

FIG. 45B

AFTER CONVERSION

```
   :
   :
new 8001
   :
   :
putfield 7
   :
```

FIG. 52

CLASS-DESIGN-NON-DEPENDENT FIELD OFFSET TABLE FOR Built_in_classX

| FIELD OFFSET | INSTANCE FIELD |
|---|---|
| 1 | fieldX1 |
| 2 | fieldX2 |
| 3 | null |
| 4 | null |
| 5 | null |
| 6 | null |
| 7 | null |

CLASS-DESIGN-NON-DEPENDENT FIELD OFFSET TABLE FOR Built_in_classY

| FIELD OFFSET | INSTANCE FIELD |
|---|---|
| 1 | fieldX1 |
| 2 | fieldX2 |
| 3 | null |
| 4 | null |
| 5 | null |
| 6 | null |
| 7 | null |
| 8 | fieldY1 |
| 9 | fieldY2 |
| 10 | fieldY3 |
| 11 | null |
| 12 | null |
| 13 | null |
| 14 | null |
| 15 | null |

FIG. 53A

FOR TERMINAL APPARATUS A

INSTANCE FIELD OFFSET TABLE FOR Built_in_classX

| FIELD OFFSET | INSTANCE FIELD |
|---|---|
| 1 | fieldX1 |
| 2 | fieldX2 |
| 3 | privateX1 |
| 4 | privateX2 |
| 5 | privateX3 |
| 6 | null |
| 7 | null |

INSTANCE FIELD OFFSET TABLE FOR Built_in_classY

| FIELD OFFSET | INSTANCE FIELD |
|---|---|
| 1 | fieldX1 |
| 2 | fieldX2 |
| 3 | privateX1 |
| 4 | privateX2 |
| 5 | privateX3 |
| 6 | null |
| 7 | null |
| 8 | fieldY1 |
| 9 | fieldY2 |
| 10 | fieldY3 |
| 11 | privateY1 |
| 12 | privateY2 |
| 13 | null |
| 14 | null |
| 15 | null |

FIG. 53B

FOR TERMINAL APPARATUS B

INSTANCE FIELD OFFSET TABLE FOR Built_in_classX

| FIELD OFFSET | INSTANCE FIELD |
|---|---|
| 1 | fieldX1 |
| 2 | fieldX2 |
| 3 | privateX1 |
| 4 | null |
| 5 | null |
| 6 | null |
| 7 | null |

INSTANCE FIELD OFFSET TABLE FOR Built_in_classY

| FIELD OFFSET | INSTANCE FIELD |
|---|---|
| 1 | fieldX1 |
| 2 | fieldX2 |
| 3 | privateX1 |
| 4 | null |
| 5 | null |
| 6 | null |
| 7 | null |
| 8 | fieldY1 |
| 9 | fieldY2 |
| 10 | fieldY3 |
| 11 | privateY1 |
| 12 | privateY2 |
| 13 | privateY3 |
| 14 | null |
| 15 | null |

FIG. 54

INSTANCE FIELD
OFFSET TABLE FOR User_class

| FIELD OFFSET | INSTANCE FIELD |
|---|---|
| 1 | fieldX1 |
| 2 | fieldX2 |
| 3 | null |
| 4 | null |
| 5 | null |
| 6 | null |
| 7 | null |
| 8 | fieldY1 |
| 9 | fieldY2 |
| 10 | fieldY3 |
| 11 | null |
| 12 | null |
| 13 | null |
| 14 | null |
| 15 | null |
| 16 | fieldU1 |
| 17 | fieldU2 |

FIG. 55A

INSTANCE FOR User_class
FOR TERMINAL
APPARATUS A

| INSTANCE FIELD |
| --- |
| int-TYPE VARIABLE |
| byte-TYPE VARIABLE |
| short-TYPE VARIABLE |
| int-TYPE VARIABLE |
| byte-TYPE VARIABLE |
| null |
| null |
| Object-TYPE VARIABLE |
| int-TYPE VARIABLE |
| short-TYPE VARIABLE |
| char-TYPE VARIABLE |
| long-TYPE VARIABLE |
| null |
| null |
| null |
| int-TYPE VARIABLE |
| Object-TYPE VARIABLE |

FIG. 55B

INSTANCE FOR User_class
FOR TERMINAL
APPARATUS B

| INSTANCE FIELD |
| --- |
| int-TYPE VARIABLE |
| byte-TYPE VARIABLE |
| short-TYPE VARIABLE |
| null |
| null |
| null |
| null |
| Object-TYPE VARIABLE |
| int-TYPE VARIABLE |
| short-TYPE VARIABLE |
| char-TYPE VARIABLE |
| long-TYPE VARIABLE |
| float-TYPE VARIABLE |
| null |
| null |
| int-TYPE VARIABLE |
| Object-TYPE VARIABLE |

PROGRAM GENERATION APPARATUS FOR PROGRAM EXECUTION SYSTEM, REPLACES VARIABLE NAME IN EACH CLASS FILE BY ASSIGNED OFFSET NUMBER SO THAT SAME OFFSET NUMBERS ARE ASSIGNED TO NON-DEPENDENT VARIABLES WITH SAME VARIABLE NAME

This application is based on an application No. 2000-43499 filed in Japan, the content of which is hereby incorporated by reference.

BACKGROUND OF THE INVENTION (1) Field of the Invention

The present invention relates to a technique for generating an execution program from source programs written in an object-oriented language and executing the execution program.

(2) Description of Related Art

Currently, there are various program execution systems which generate execution programs by compiling and linking source programs that are written in programming languages by users. The generated execution programs are executed in computer-integrated systems such as mobile telephones, Set Top Boxes (STBs), televisions or the like, or executed in personal computers (hereinafter referred to as PCs).

The following is a description of a conventional program execution system that allows the computer-integrated systems to operate based on a source program written in Java (Java is a trade mark of Sun Microsystems), an object-oriented language.

The conventional program execution system is composed of a program generation apparatus and a terminal apparatus which is a computer-integrated system.

The program generation apparatus compiles (1) source programs of one user class, and (2) programs stored in base libraries provided for different terminal apparatuses, and links the programs to generate a different light-weight user class file for each terminal apparatus. Here, the base library includes a group of files which constitute a program that depends on a terminal apparatus and is directly related to control of hardware units inherent in the terminal apparatus, such as a program for controlling the data communications or display on a display unit.

The light-weight user class file generated for each terminal apparatus is stored in the terminal apparatus, and each terminal apparatus operates according to its own user class file.

Now, the conventional program execution system will be described in detail using two types of terminal apparatuses A and B which differ from each other in terms of a part of the hardware construction. Here, it is supposed that light-weight user class files are generated from source programs of the same user class, and that the generated user class files are executed in the corresponding terminal apparatuses.

FIGS. 1 and 2 show examples of source programs written in Java from which base class files that respectively allow the terminal apparatuses A and B perform the same process is generated. FIG. 3 shows an example of a source program written in Java from which a user class file that is used by the terminal apparatuses A and B in common is generated. It should be noted here that in these figures, only field definitions are shown, and descriptions related to detailed use of these fields in methods are omitted.

As shown in FIG. 1, the class Built_in_classX includes instance fields "privateX1", "privateX2", and "privateX3" and instance fields "fieldX1" and "fieldX2". The instance fields "privateX1", "privateX2", and "privateX3" each include a modifier "private", which indicates that accesses from methods included in other classes are prohibited. The instance fields "fieldX1" and "fieldX2" can be accessed from other classes.

Also, the class Built_in_classY includes instance fields "privateY1" and "privateY2" and instance fields "fieldY1", "fieldY1", "fieldY2", and "fieldY3". Since the instance fields "privateY1" and "privateY2" have a modifier "private", accesses from methods included in other classes to these instance fields are prohibited. The instance fields "fieldY1", "fieldY2", and "fieldY3" can be accessed from other classes.

The class Built_in_classX shown in FIG. 2 includes (1) instance field "privateX1" which cannot be accessed from methods included in other classes and (2) instance fields "fieldX1" and "fieldX2" which can be accessed from other classes. Also, the class Built_in_classY shown in FIG. 2 includes (1) instance field "privateY1", "privateY2", and "privateY3" which cannot be accessed from methods included in other classes and (2) instance fields "fieldY1", "fieldY2", and "fieldY3" which can be accessed from other classes.

In each of the above source programs, the class Built_in_classX is inherited by the class Built_in_classY, and the class Built_in_classY is inherited by the class User_class.

For each of the terminal apparatuses A and B, a class Built_in_classX and a class Built_in_classY are compiled to generate one base class file.

As understood from above, both terminal apparatuses A and B use a class Built_in_classX and a class Built_in_classY which provide the same function for either of the terminal apparatuses A and B, respectively. The instance fields used in both the two classes, such as "fieldX1", "fieldX2", "fieldY1", "fieldY2", and "fieldY3" can be accessed by other classes and provide the same contents for either of the class Built_in_classX and class Built_in_classY.

The two classes also include a different number of instance fields that include different contents and cannot be accessed from other classes. For example, the class Built_in_classX for terminal apparatus A uses "privateX1", "privateX2", and "privateX3"; and the class Built_in_classX for terminal apparatus B uses only "privateX1".

Note here that the "privateX1"s for terminal apparatuses A and B have the same name but different contents. This also applies to the "privateY1"s and "privateY2"s.

The instance fields "privateX1", "privateX2", "privateX3", "privateY1", and "privateY2" for terminal apparatus A and the instance fields "privateX1", "privateY1", "privateY2", and "privateY3" for terminal apparatus B are defined with the modifier "private", are used to exercise control according to the hardware of each of the terminal apparatuses A and B, and depend on the base class design of the terminal apparatus. Hereinafter, these instance fields are therefore referred to as class-design-dependent fields.

The other instance fields "fieldX1", "fieldX2", "fieldY1", "fieldY2", and "fieldY3" commonly used by the terminal apparatuses A and B are used to exercise control common to the terminal apparatuses A and B, and are not dependent on the base class design of the terminal apparatus. Hereinafter, these instance fields are referred to as class-design-non-dependent fields.

A class User_class is compiled to become a user class file. As shown in FIG. 3, the class User_class uses instance fields "fieldU1" and "fieldU2".

FIGS. 4 to 7 shows instance field offset tables of the above class Built_in_classXs, class Built_in_classYs, and class User_class. Each instance field offset table includes unique numbers assigned to the instance fields by the conventional program generation apparatus.

FIGS. 4 and 5 show instance field offset tables for base class files. FIGS. 6 and 7 show instance field offset tables for user class files. FIGS. 4 and 6 correspond to the terminal apparatus A, and FIGS. 5 and 7 correspond to the terminal apparatus B.

As shown in FIGS. 4 and 5, the instance field offset tables of the class Built_in_classYs include the instance fields inherited from the class Built_in_classXs, with the same offset numbers assigned. More specifically, for the terminal apparatus A, the same offset numbers as the class Built_in_classX are assigned to the instance fields "fieldX1", "fieldX2", "privateX1", "privateX2", and "privateX3"; and for the terminal apparatus B, the same offset numbers as the class Built_in_classX are assigned to the instance fields "fieldX1", "fieldX2", and "privateX1".

As shown in FIGS. 6 and 7, the instance field offset tables of the classes "User_class" include the instance fields inherited from the class Built_in_classYs, with the same offset numbers assigned. More specifically, for the terminal apparatus A, the same offset numbers as the class Built_in_classY are assigned to the instance fields "fieldX1", "fieldX2", "privateX1", "privateX2", "privateX3", "fieldY1", "fieldY2", "fieldY3", "privateY1", and "privateY2". This also applies to the terminal apparatus B.

As shown in FIG. 6, in the instance field offset table for the terminal apparatus A, offset numbers "11" and "12" are assigned to the instance fields "fieldU1" and "fieldU2", while as shown in FIG. 7, in the instance field offset table for the terminal apparatus B, offset numbers "10" and "11" are assigned to the instance fields "fieldU1" and "fieldU2".

The program generation apparatus modifies each class file according to the instance field offset tables. More specifically, instance field names used as operands in the instructions included in each class file are replaced with the corresponding offset numbers, and identification information corresponding to the instance fields are deleted from the constant pool in the class file. In this way, a different light-weight user class file is generated for each terminal apparatus from source programs of the same user class.

The conventional program execution system, however, needs to link as many times as there are types of terminal apparatuses (i.e., types of light-weight base classes) even if source programs of the same user class are used.

SUMMARY OF THE INVENTION

It is therefore an object of the present invention to provide a program generation apparatus, a program generation method, a record medium recording a program generation program, a virtual machine, a program execution method, a record medium recording a program execution program, and a record medium recording a program generated by the program generation apparatus for generating an execution program from a source program written in a object-oriented language, where a different set of base classes are prepared for each terminal apparatus, and an execution program for each terminal apparatus is generated, characterized in that when a common program is compiled and linked, linkage for each terminal apparatus is not necessary.

The above object is fulfilled by a program generation apparatus for generating a plurality of light-weight class files for each terminal apparatus by linking a plurality of class files for each terminal apparatus, the program generation apparatus comprising: a storage means for prestoring the plurality of class files for each terminal apparatus, wherein each class defines (a) dependent variables unique to each terminal apparatus and (b) non-dependent variables common to all the plurality of terminal apparatuses, each variable is identified by a variable name, and each class file includes a variable name for each variable; an assignment means for assigning an offset number to each variable defined in the plurality of class files so that the same offset numbers are assigned to non-dependent variables having the same variable names; and a generation means for generating the plurality of light-weight class files for each terminal apparatus by replacing each variable name in each class file with an offset number assigned by the assignment means.

With the above construction, a different offset number is generated for each variable defined in the class files stored in the storage means so that the same offset numbers are assigned to non-dependent variables having the same variable names in different terminal apparatuses when linkage is performed for each terminal apparatus. Light-weight class files are then generated using the generated offset numbers. Therefore, when a common program is compiled and linked, the light-weight class files are generated, eliminating the necessity of linkage for each terminal apparatus.

In the above program generation apparatus, the assignment means may assign an offset number to each variable using different numbering systems for dependent variables and non-dependent variables.

With the above construction, offset numbers are assigned using different numbering systems for dependent variables and non-dependent variables. Therefore, the same offset numbers are definitely assigned to non-dependent variables having the same variable names in different terminal apparatuses.

In the above program generation apparatus, the generation means may further generate a non-dependent variable count and a dependent variable count for each class and adds to each light-weight class file the generated non-dependent variable count and the generated dependent variable count which indicate the number of non-dependent variables and the number of dependent variables included in a class, respectively.

The above construction enables a virtual machine to generate an instance using the non-dependent variable count and the dependent variable count generated for each class and included in the light-weight class files.

In the above program generation apparatus, the plurality of classes may include a first class and a second class which inherits the first class, and the assignment means assigns an offset number to each variable using, in terms of the second class, different numbering systems for (a) dependent variables defined only in the second class and (b) dependent variables defined in the first class inherited by the second class.

With the above construction, an offset number is assigned to each variable using, in terms of the second class, different numbering systems for (a) dependent variables defined only in the second class and (b) dependent variables defined in the first class inherited by the second class. Therefore, the above dependent variables (a) and (b) can definitely be distinguished from each other.

In the above program generation apparatus, the generation means may further generate a non-dependent variable count and a dependent variable count for each class and adds to each light-weight class file the generated non-dependent variable count and the generated dependent variable count which indicate the number of non-dependent variables and the number of dependent variables included in a class, respectively.

The above construction enables a virtual machine to generate an instance using the non-dependent variable count and the dependent variable count generated for each class and included in the light-weight class files.

In the above program generation apparatus, the plurality of classes may include a first class and a second class which inherits the first class, and the assignment means assigns an offset number to each variable using, in terms of the second class, one numbering system for (a) dependent variables defined only in the second class and (b) dependent variables defined in the first class inherited by the second class.

With the above construction, an offset number is assigned to each variable using, in terms of the second class, one numbering system for (a) dependent variables defined only in the second class and (b) dependent variables defined in the first class inherited by the second class. This makes the management easier since the number of used numbering systems is less.

In the above program generation apparatus, the generation means may further generate a non-dependent variable count and a dependent variable count for each class and adds to each light-weight class file the generated non-dependent variable count and the generated dependent variable count which indicate the number of non-dependent variables and the number of dependent variables included in a class, respectively.

The above construction enables a virtual machine to generate an instance using the non-dependent variable count and the dependent variable count generated for each class and included in the light-weight class files.

In the above program generation apparatus, the plurality of classes may include a first class and a second class which inherits the first class, and the number assignment means assigns an offset number to each variable using one numbering system regardless of dependent variables or non-dependent variables, and provides, in terms of the second class, a predetermined space between (a) variables defined only in the second class and (b) variables defined in the first class inherited by the second class.

With the above construction, offset numbers are assigned using one numbering system regardless of dependent variables or non-dependent variables, and in terms of the second class, a predetermined space is provided between (a) variables defined only in the second class and (b) variables defined in the first class inherited by the second class. This makes the management of offset numbers easier.

In the above program generation apparatus, the generation means further generates a non-dependent variable count for each class, and adds the non-dependent variable count to a dependent variable count being a fixed value to obtain a count, and adds the obtained count to each light-weight class file.

The above construction enables a virtual machine to generate an instance using the non-dependent variable count and the dependent variable count generated for each class and included in the light-weight class files.

The above object is also fulfilled by a virtual machine for operating according to a plurality of light-weight class files generated by the above program generation apparatus, comprising: a storage means for prestoring the plurality of light-weight class files; an instance generation means for reading the plurality of light-weight class files and generating an instance according to offset numbers for variables included in the plurality of light-weight class files; and an execution means for executing instructions defined in the plurality of light-weight class files, using the generated instance.

With the above construction, an instance is generated according to offset numbers for variables included in the light-weight class files generated in the program generation apparatus. This eliminates the necessity of linkage for each terminal apparatus when compiling and linking a common program. Also, the program generated in this way can be executed in each terminal apparatus.

The above object is also fulfilled by a virtual machine for operating according to a plurality of light-weight class files generated by the above program generation apparatus, comprising: a storage means for prestoring the plurality of light-weight class files; an instance generation means for generating an instance by (a) reading the plurality of light-weight class files, (b) allocating a first area and a second area in a memory based on, respectively, non-dependent variable counts and dependent variable counts generated for each class and included in the read light-weight class files, and (c) storing in the second area a pointer pointing to the first area; and an execution means for executing instructions defined in the plurality of light-weight class files, using the generated instance.

With the above construction, and instance is generated by allocating the first and second areas in a memory based on the non-dependent variable counts and the dependent variable counts included in the light-weight class files, and storing in the second area a pointer pointing to the first area. This secures the generation of the instance.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows an example of a source program written in Java from which a base class file is generated, the base class file allowing a terminal apparatus A of a conventional program execution system to perform processes;

FIG. 2 shows an example of a source program written in Java from which a base class file is generated, the base class file allowing a terminal apparatus B of a conventional program execution system to perform processes;

FIG. 3 shows an example of a source program written in Java from which a user class file that is used by the terminal apparatuses A and B in common is generated;

FIG. 4 shows an instance field offset table for base class files for terminal apparatus A in the conventional program execution system;

FIG. 5 shows an instance field offset table for base class files for terminal apparatus B in the conventional program execution system;

FIG. 6 shows an instance field offset table for user class files for terminal apparatus A in the conventional program execution system;

FIG. 7 shows an instance field offset table for user class files for terminal apparatus B in the conventional program execution system;

FIG. 11 shows class-design-non-dependent field offset tables corresponding to base classes Built_in_classX and Built_in_classY;

FIG. 12A shows class-design-dependent field offset tables corresponding to the base class Built_in_classX and the base class Built_in_classY for terminal apparatus A;

FIG. 12B shows class-design-dependent field offset tables corresponding to the base class Built_in_classX and the base class Built_in_classY for terminal apparatus B;

FIG. 13 shows a class-design-non-dependent field offset table corresponding to user class User_class;

FIG. 16A shows a class file for a Java user class before conversion;

FIG. 16B shows a class file for a Java user class after conversion;

FIG. 17 shows a Java program which is compiled to base class files;

FIG. 19A shows base class Built_in_classY for terminal apparatus A before conversion;

FIG. 19B shows base class Built_in_classY for terminal apparatus A after conversion;

FIG. 20 shows a class ID correspondence table for base classes;

FIG. 21 shows a class ID correspondence table for user classes;

FIG. 22 shows an example of a class-design-non-dependent field count table corresponding to a light-weight base class file common to the terminal apparatuses A and B;

FIG. 23 shows an example of a class-design-non-dependent field count table corresponding to a light-weight user class file common to the terminal apparatuses A and B;

FIG. 24A shows a class-design-dependent field count table for a light-weight base class file for terminal apparatus A;

FIG. 24B shows a class-design-dependent field count table for a light-weight base class file for terminal apparatus B;

FIG. 33 shows an example of a Java program from which class files are generated via compilation;

FIG. 35 shows an example of a Java program from which class files are generated via compilation;

FIG. 37 shows two class-design-non-dependent field offset tables that are generated to correspond to base classes in the program execution system 2;

FIG. 38A shows a class-design-dependent field offset table that is generated to correspond to base classes for terminal apparatus A;

FIG. 38B shows a class-design-dependent field offset table that is generated to correspond to base classes for terminal apparatus B;

FIG. 39 shows the class-design-non-dependent field offset table corresponding to the user class User_class shown in FIG. 3;

FIG. 41 shows a class-design-non-dependent field count table included in a light-weight base class file for the terminal apparatuses A and B;

FIG. 42A shows a class-design-dependent field count table included in light-weight base class files for the terminal apparatus A;

FIG. 42B shows a class-design-dependent field count table included in light-weight base class files for the terminal apparatus B;

FIG. 43 shows a class-design-non-dependent field count table included in a light-weight user class file for the terminal apparatuses A and B;

FIG. 44A shows a class file, before conversion, for the base class Built_in_classY for the terminal apparatus A;

FIG. 44B shows a class file, after conversion, for the base class Built_in_classY for the terminal apparatus A;

FIG. 45A shows a class file for the user class before conversion;

FIG. 45B shows a class file for the user class after conversion;

FIG. 52 shows two class-design-non-dependent field offset tables corresponding to the base classes Built_in_classX and Built_in_classY;

FIG. 53A shows an instance field offset table for the terminal apparatus A;

FIG. 53B shows an instance field offset table for the terminal apparatus B;

FIG. 54 shows an instance field offset table generated in correspondence to the user class User_class shown in FIG. 3;

FIG. 55A shows an instance of the user class User_class generated by the terminal apparatus A; and FIG. 55B shows an instance of the user class User_class generated by the terminal apparatus B.

DESCRIPTION OF THE PREFERRED EMBODIMENTS

The following are description of program execution systems as embodiments of the present invention.

1. First Embodiment

The program execution system 1 will be described as the first embodiment of the present invention.

1.1 Construction of Program Execution System 1

The construction of a program execution system 1 will be described with reference to its block diagram shown in FIG. 8.

Figure 8:
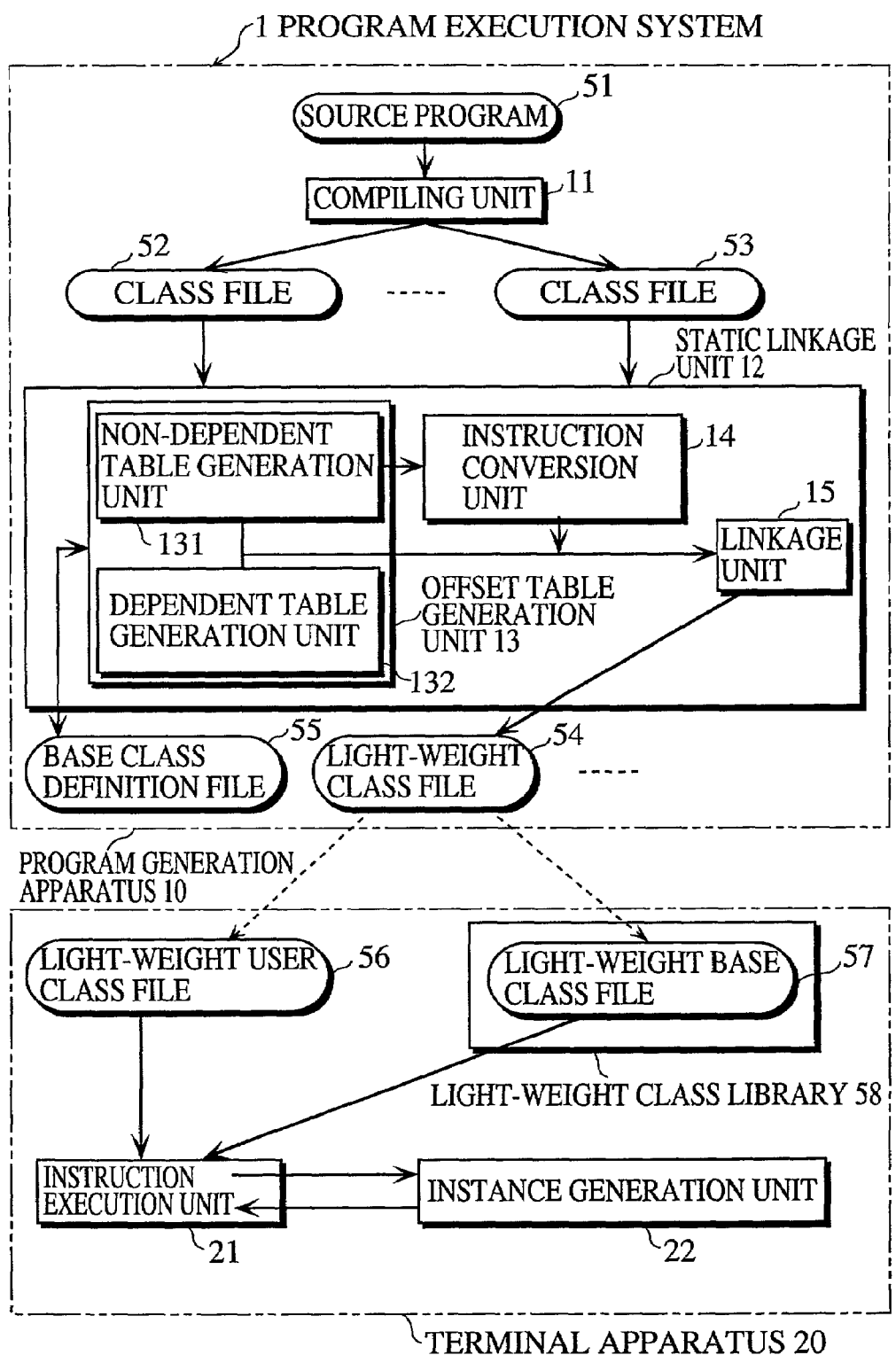
FIG. 8 is a block diagram showing the construction of a program execution system 1.

The program execution system 1 is, as shown in FIG. 8, composed of a program generation apparatus 10 and a terminal apparatus (i.e., light virtual machine) 20 which is a computer-integrated system. The program generation apparatus 10 includes a compiling unit 11, a static linkage unit 12, and a storage unit which is not illustrated. The terminal apparatus 20 includes an instruction execution unit 21, an instance generation unit 22, and a storage unit which is not illustrated.

The program generation apparatus 10 and terminal apparatus 20 are both computer systems including a microprocessor, a RAM, a ROM or the like, where the RAM or ROM stores a computer program. The functions of the program generation apparatus 10 and terminal apparatus 20 are achieved as the microprocessor operates according to the computer program.

It should be noted that though the compiling unit 11 and static linkage unit 12 are included in one program generation apparatus 10, they may be included in different apparatuses. In this case, either of them may include a program generation unit for generating a light-weight user class file 56.

(1) Source Program 51

A source program 51 is stored in the storage unit in the program generation apparatus 10. The source program 51 is written in Java by a user, and includes a plurality of classes. The source program 51 is classified into (a) a program related to base classes and (b) a program related to user classes.

(2) Base Class Definition Files 55

A base class definition files 55 are prestored in the storage unit in the program generation apparatus 10. The base class definition files 55 show definitions of classes, methods, and fields included in a light-weight base class library 58 which is prestored in the terminal apparatus 20. The base class definition files 55 do not include such information as names, types, and counts of class-design-dependent fields.

(3) Compiling Unit 11

The compiling unit 11 reads the source program 51 from the storage unit, compiles the source program 51, and generates class files 52, . . . , 53 which correspond to classes included in the source program 51. The class files 52, . . . , 53 are classified into (a) those related to base classes and (b) those related to user classes. The compiling unit 11 writes the generated class files 52, . . . , 53 into the storage unit.

(4) Static Linkage Unit 12

The static linkage unit 12 reads the class files 52, . . . , 53 and base class definition files 55 from the storage unit, uses the base class definition files 55 as necessary, performs a linkage concerning identification information in the constant pool in the class files 52, . . . , 53, deletes pieces of identification information, which has become unnecessary due to the size reduction, to generate light-weight class files 54 . . . and writes the light-weight class files 54 . . . into the storage unit.

The light-weight class files 54 . . . are classified into (a) light-weight base class files and (b) light-weight user class files. The light-weight base class files are light-weight class files related to the construction and control of the hardware inherent in the terminal apparatus 20. The light-weight user class files are light-weight class files as user class files.

The static linkage unit 12 is composed of an offset table generation unit 13, an instruction conversion unit 14, and a linkage unit 15.

The offset table generation unit 13 assigns offset numbers to instance fields used in class files. The offset table generation unit 13 includes a non-dependent table generation unit 131 and a dependent table generation unit 132. The non-dependent table generation unit 131 generates class-design-non-dependent field offset tables which correspond to class-design-non-dependent fields which do not depend on the design of the terminal apparatus hardware (i.e., base classes). The dependent table generation unit 132 generates class-design-dependent field offset tables which correspond to class-design-dependent fields which depend on the design of the terminal apparatus hardware. The offset table generation unit 13 generates a count table, and writes the generated count table into a light-weight class file.

The instruction conversion unit 14 converts offsets into offset numbers, where the offsets are included in a constant pool and indicate instance fields included in class files.

The linkage unit 15 performs other linkage processes.

(5) Light-Weight User Class File 56, Light-Weight Base Class File 57

Light-weight base class files are stored as light-weight base class files 57 into the terminal apparatus 20 prior to execution of light-weight user class files 56. Light-weight user class files are distributed via a certain transmission line, then downloaded and stored into the terminal apparatus 20.

The light-weight base class library 58 prestores a plurality of light-weight base class files as a file group. The light-weight user class files stored in the terminal apparatus 20 have already been linked with the light-weight base class files included in the light-weight base class library 58 that are specified by the light-weight user class files 56. In other words, identification information for the files has been reduced in size.

(6) Instruction Execution Unit 21, Instance Generation Unit 22

The instruction execution unit 21 calls an instruction from a light-weight user class file 56, and executes the instruction. In doing this, the instruction execution unit 21 calls a light-weight base class file 57 and executes it. The instance generation unit 22 generates instances as it executes instructions.

1.2 Operation of Program Generation Apparatus 10

The operation of the program generation apparatus 10 in generating light-weight base class files and light-weight user class files will be described with reference to FIGS. 9 and 10.

(1) Generating Light-Weight Base Class Files

Figure 9:
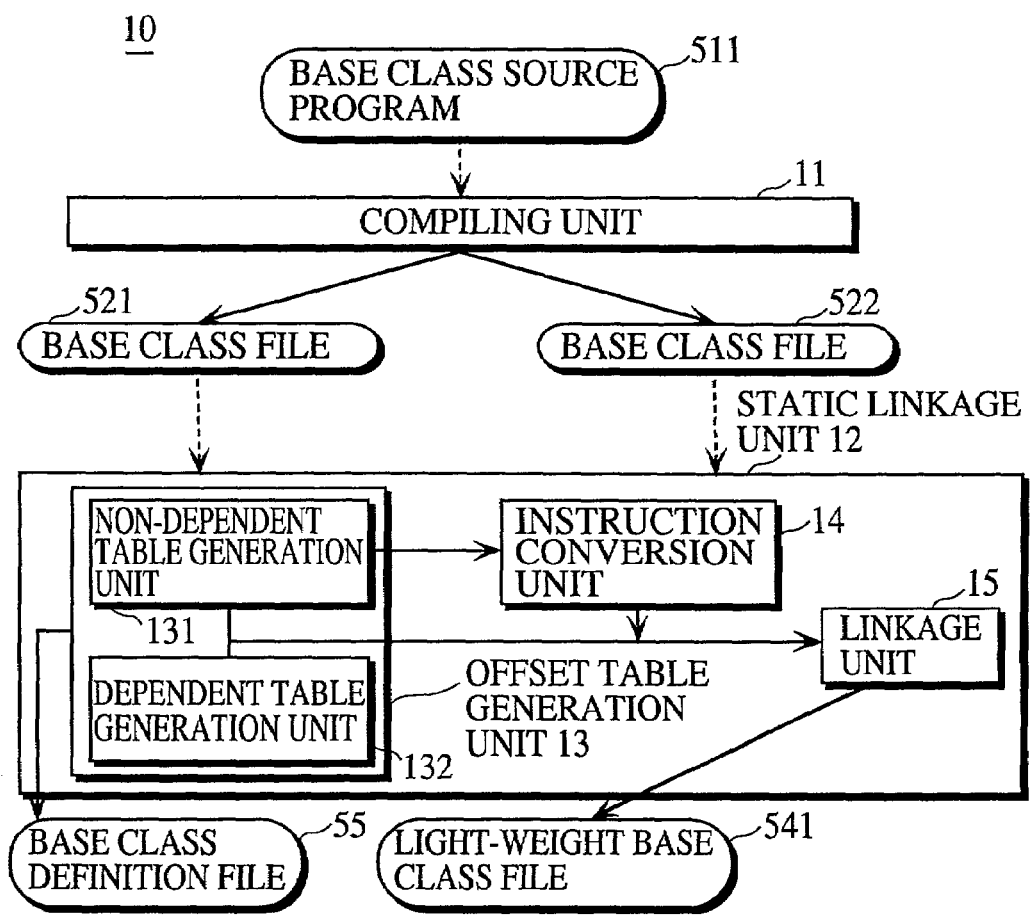
FIG. 9 shows generation of a light-weight base class file 541 by the program generation apparatus 10 from a base class source program 511.

FIG. 9 shows an operation of the program generation apparatus 10 when it generates light-weight base class files 541 from base class source programs 511.

The compiling unit 11 compiles the base class source programs 511 to generate base class files 521, . . . , 522. The non-dependent table generation unit 131 in the static linkage unit 12 generates class-design-non-dependent field offset tables shown in FIG. 11 from the base class files 521, . . . , 522. The dependent table generation unit 132 in the static linkage unit 12 generates class-design-dependent field offset tables shown in FIG. 12 from the base class files 521, . . . , 522. The instruction conversion unit 14 converts, in accordance with the tables shown in FIGS. 11 and 12, the offsets in the constant pool into offset numbers which are assigned when each table is generated. Note that the offsets in the constant pool indicate instance fields used as operands in certain instructions such as the getfield instruction and the putfield instruction. The linkage unit 15 performs other linkage processes.

The offset table generation unit 13 collects definitions of classes, methods, and fields from the base class files 521, 522, and stores the collected definitions into the base class definition files 55. As described earlier, the base class definition files 55 do not include such information as names, types, and counts of class-design-dependent fields, and the contents of the generated base class definition files 55 are the same regardless of the type of each terminal.

(2) Generating Light-Weight User Class Files

Figure 10:
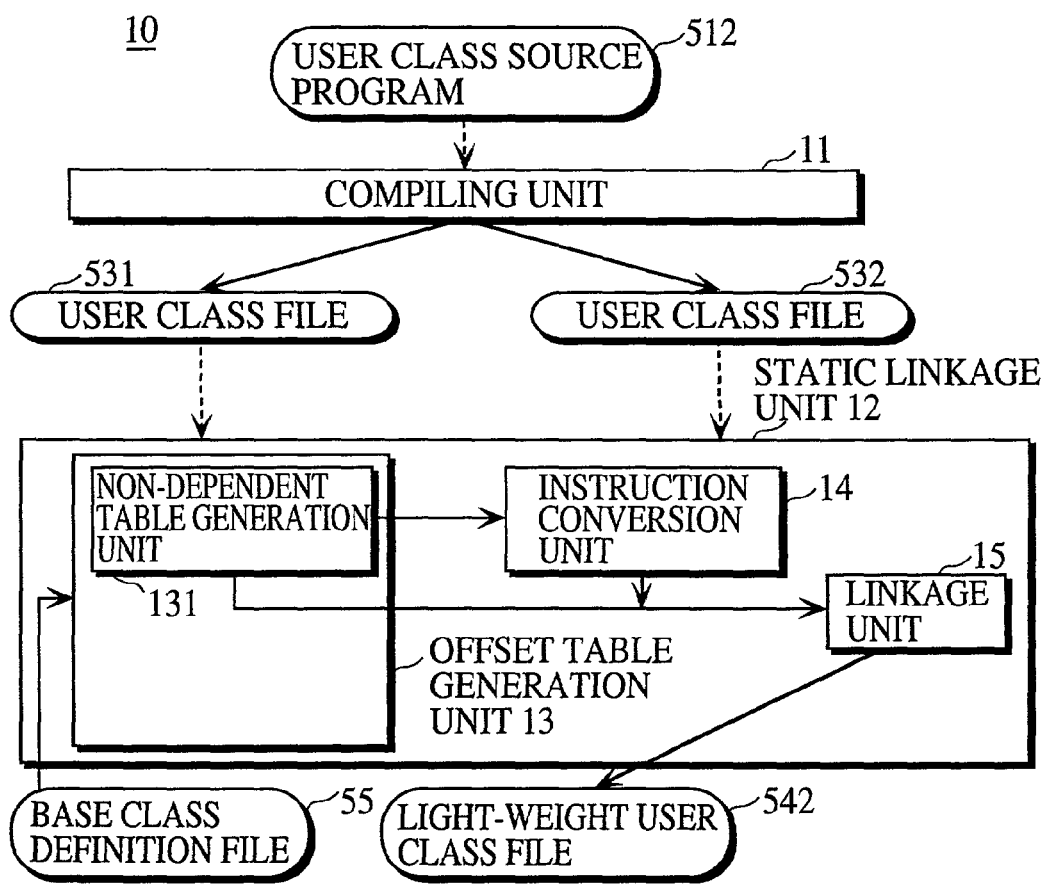
FIG. 10 shows generation of a light-weight user class file 542 by the program generation apparatus 10 from a user class source program 512.

FIG. 10 shows an operation of the program generation apparatus 10 when it generates light-weight user class files 542 from user class source programs 512.

After generating the light-weight base class files, the compiling unit 11 compiles the user class source programs 512 to generate user class files 531, . . . , 532. The non-dependent table generation unit 131 in the static linkage unit 12 generates class-design-non-dependent field offset tables shown in FIG. 13 from the user class files 531, . . . , 532 and the generated base class definition files 55. The instruction conversion unit 14 converts, in accordance with these tables, the offsets in the constant pool into offset numbers which are assigned when each table is generated. Note that the offsets in the constant pool indicate instance fields used as operands in certain instructions. The linkage unit 15 performs other linkage processes.

(3) Brief Account

The base class definition files 55 for each program execution system 1 of the present embodiment are unique to the system 1, and do not depend on the construction of the light-weight base class files of the terminal apparatus 20. The static linkage unit 12 links user class files to base class files using the base class definition files 55. Also, the static linkage unit 12 generates the same light-weight user class files 542 from the source programs 512 of the same user class for a plurality of different terminal apparatuses so that the class-design-non-dependent field offset tables, or the instance field offset tables for the light-weight user class files do not include information related to the class-design-dependent fields, by using a pointer or the like.

1.3 Field Offset Table

The following is a detailed description of (a) the class-design-dependent or -non-dependent field offset tables for the light-weight base class files and (b) the class-design-non-dependent field offset tables for the light-weight user class files, with reference to FIGS. 11 to 13.

Each field offset table is generated by the program generation apparatus 10, and includes an area for storing a plurality of pairs of a field offset number and an instance field.

The above field offset tables are used by the instruction conversion unit 14 when it converts the getfield instruction and the putfield instruction, and are discarded when the static linkage unit 12 ends the process.

As is the case with the conventional program execution system, it is supposed here that two types of terminal apparatuses A and B which differ from each other in terms of a part of the hardware construction execute light-weight user class files which are generated from source programs of the same user class. It is also supposed that storage unit of the program generation apparatus 10 stores the Java programs shown in FIGS. 1 to 3.

(1) Class-Design-Non-Dependent Field Offset Tables for Base Classes

FIG. 11 shows two class-design-non-dependent field offset tables that are generated to correspond to the base class Built_in_classX and the base class Built_in_classY shown in FIGS. 1 and 2, respectively.

The non-dependent table generation unit 131 in the static linkage unit 12 generates the class-design-non-dependent field offset tables to correspond to the base class Built_in_classX and the base class Built_in_classY shown in FIGS. 1 and 2, respectively.

As shown in the class-design-non-dependent field offset table shown in FIG. 11 that corresponds to the base class Built_in_classX shown in FIG. 1, the non-dependent table generation unit 131 assigns field offset numbers "2" and "3" to the class-design-non-dependent fields "fieldX1" and "fieldX2", respectively, in the order of definition. The non-dependent table generation unit 131 writes "null" in the area in the "instance field" column corresponding to the field offset number "1", where the instance field "null" stores a pointer when a terminal apparatus generates instances, the pointer pointing to an area corresponding to a class-design-dependent field offset table.

As shown in the class-design-non-dependent field offset table shown in FIG. 11 that corresponds to the base class Built_in_classY, the non-dependent table generation unit 131 assigns field offset numbers "2" and "3" to the class-design-non-dependent fields "fieldX1" and "fieldX2" in the same manner as the base class Built_in_classX, where these fields are inherited from the base class Built_in_classX. The non-dependent table generation unit 131 assigns offset numbers "5", "6", and "7" to the class-design-non-dependent fields "fieldY1", "fieldY2", and "fieldY3", respectively, in the order of definition, where these fields are newly defined in the base class Built_in_classY. The non-dependent table generation unit 131 writes "null" in the area in the "instance field" column corresponding to the field offset number "1", where the instance field "null" stores a pointer when a terminal apparatus generates instances, the pointer pointing to the same area as the pointer stored in the instance field "null" shown in the class-design-non-dependent field offset table for the base class Built_in_classX when a terminal apparatus generates instances. The non-dependent table generation unit 131 also writes "null" in the area in the "instance field" column corresponding to the field offset number "4", where this instance field "null" stores a pointer when a terminal apparatus generates instances, the pointer pointing to an area corresponding to a class-design-dependent field offset table that corresponds to class-design-dependent fields defined in the base class Built_in_classy.

(2) Base Class Class-Design-Dependent Field Offset Tables

FIG. 12 shows class-design-dependent field offset tables corresponding to the base class Built_in_classX and the base class Built_in_classY.

The class-design-non-dependent field offset tables are common to the terminal apparatuses A and B, while different class-design-dependent field offset tables are used for the terminal apparatuses A and B since different class-design-dependent fields are used. The dependent table generation unit 132 generates the class-design-dependent field offset tables shown in FIG. 12A for the terminal apparatus A in correspondence to different base classes, respectively, and generates the class-design-dependent field offset tables shown in FIG. 12B for the terminal apparatus B.

As described above, when the light-weight base class files 541 are generated, class-design-non-dependent field offset tables and class-design-dependent field offset tables are generated for each of the base class Built_in_classX and Built_in_classY.

(3) User Class Class-Design-Non-Dependent Field Offset Tables

Figure 14:
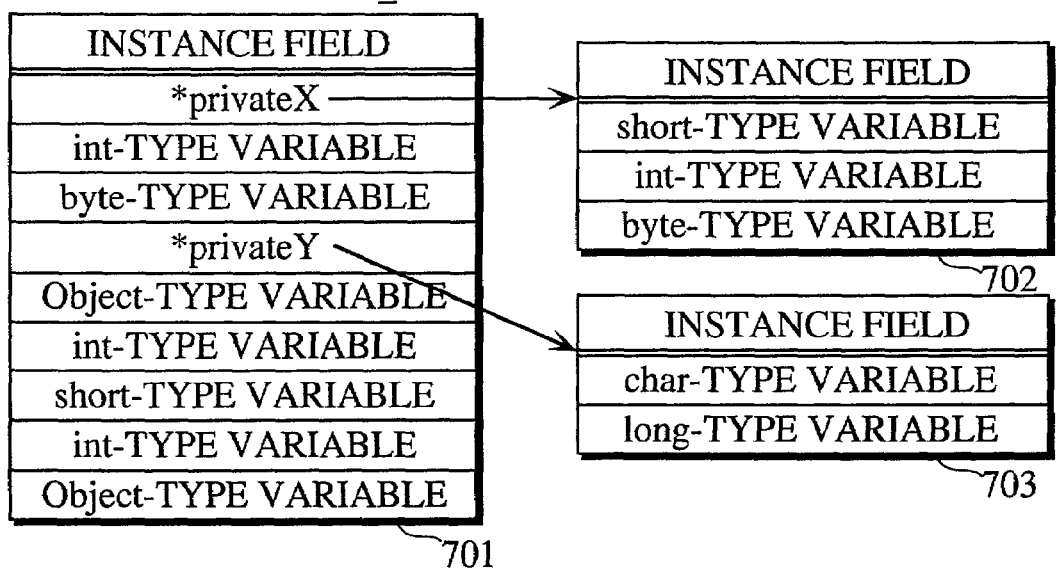
FIG. 14 shows an instance for user class User_class generated in terminal apparatus A.
Figure 15:
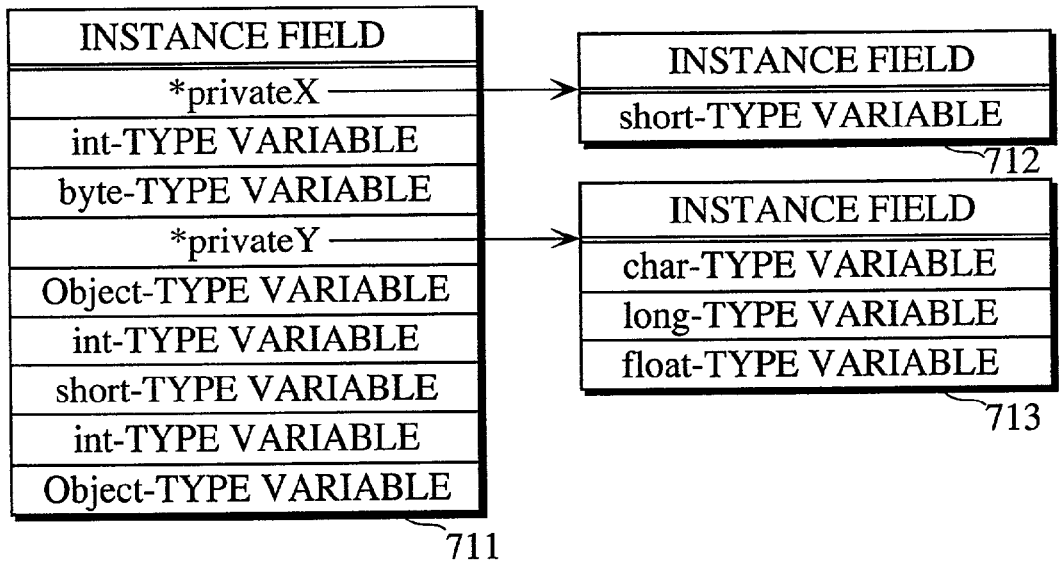
FIG. 15 shows an instance for user class User_class generated in terminal apparatus B.

When the light-weight user class file 542 shown in FIG. 10 is generated, the class-design-non-dependent field offset table corresponding to the user class User_class shown in FIG. 13 is generated, and the instances shown in FIGS. 14 and 15 are generated according to executions in the terminal apparatus 20.

FIG. 13 shows the class-design-non-dependent field offset table corresponding to the user class User_class shown in FIG. 3. FIGS. 14 and 15 show the instances corresponding to the user classes User_class generated in the terminal apparatuses A and B, respectively.

The non-dependent table generation unit 131 in the static linkage unit 12 generates a class-design-non-dependent field offset table to correspond to the user class User_class.

As shown in FIG. 13, the non-dependent table generation unit 131 assigns field offset numbers "2", "3", "5", "6", and "7" respectively to the class-design-non-dependent fields "fieldX1", "fieldX2", "fieldY1", "fieldY2", and "fieldY3" which are inherited from the base class Built_in_classY. The non-dependent table generation unit 131 assigns offset numbers "8" and "9" to the newly defined class-design-non-dependent fields "fieldU1" and "fieldU2", respectively, in the order of definition. The non-dependent table generation unit 131 writes "null" in the areas in the "instance field" column corresponding to the field offset numbers "1" and "4", where the instance fields "null" stores pointers when terminal apparatuses generate instances, the pointers pointing to the same areas as the pointers stored in the instance fields "null" shown in the class-design-non-dependent field offset tables for the base classes Built_in_classX and Built_in_classY when terminal apparatuses generate instances.

1.4 Generated Instances

The instance generation unit 22 of the terminal apparatus 20 generates the instances shown in FIGS. 14 and 15.

The instance generation unit 22 of the terminal apparatus A first allocates a memory area 701 corresponding to the class-design-non-dependent field offset table shown in FIG. 13. This will be described in detail later. The instance generation unit 22 then allocates memory areas 702 and 703 corresponding to the class-design-dependent field offset tables shown in FIG. 12A. The memory area 701 includes two pointer areas corresponding to instance fields "null". The instance generation unit 22 stores two different pointers in the two pointer areas, where the first pointer points to the memory area 702 that corresponds to the class-design-dependent field offset table for the base class Built_in_classX, and the second pointer points to the memory area 703 that corresponds to the class-design-dependent field offset table for the base class Built_in_classY. In this way, the instance generation unit 22 generates instances.

Similarly, the instance generation unit 22 of the terminal apparatus B allocates a memory area 711 corresponding to the class-design-non-dependent field offset table shown in FIG. 13, then allocates memory areas 712 and 713 corresponding to the class-design-dependent field offset tables shown in FIG. 12B. The memory area 711 includes two pointer areas corresponding to instance fields "null". The instance generation unit 22 stores two different pointers in the two pointer areas, where the first pointer points to the memory area 712 that corresponds to the class-design-dependent field offset table for the base class Built_in_classX, and the second pointer points to the memory area 713 that corresponds to the class-design-dependent field offset table for the base class Built_in_classY. In this way, the instance generation unit 22 generates instances.

With the above construction, both terminal apparatuses A and B can access "fieldU1" of the user class User_class as the $8^{th}$ variable in the area corresponding to the instance.

In the program execution system 1 with the terminal apparatus 20 generating the instances as described above, the instruction conversion unit 14 of the static linkage unit 12 converts the operands in the getfield and putfield instructions corresponding to the class-design-non-dependent fields, as shown in FIG. 16.

More specifically, as shown in FIG. 16A, in the class file for an ordinary Java user class before conversion, operand <User_class.fieldU1> of the putfield instruction and operand <User_class.fieldU2> of the getfield instruction indicate offsets in the constant pool. The instruction conversion unit 14 converts the offsets into offset numbers that identify instance fields in the instance field, based on the above described instance field offset tables. The instruction conversion unit 14 also converts operand <User_class> of the "new" instruction into a certain number. As a result of this, the class file shown in FIG. 16B is obtained. As shown in FIG. 16B, the operands of the putfield and getfield instructions are converted into "8" and "9".

The instruction conversion unit 14 further converts the operands of the putfield and getfield instructions corresponding to class-design-dependent fields.

Figure 18:
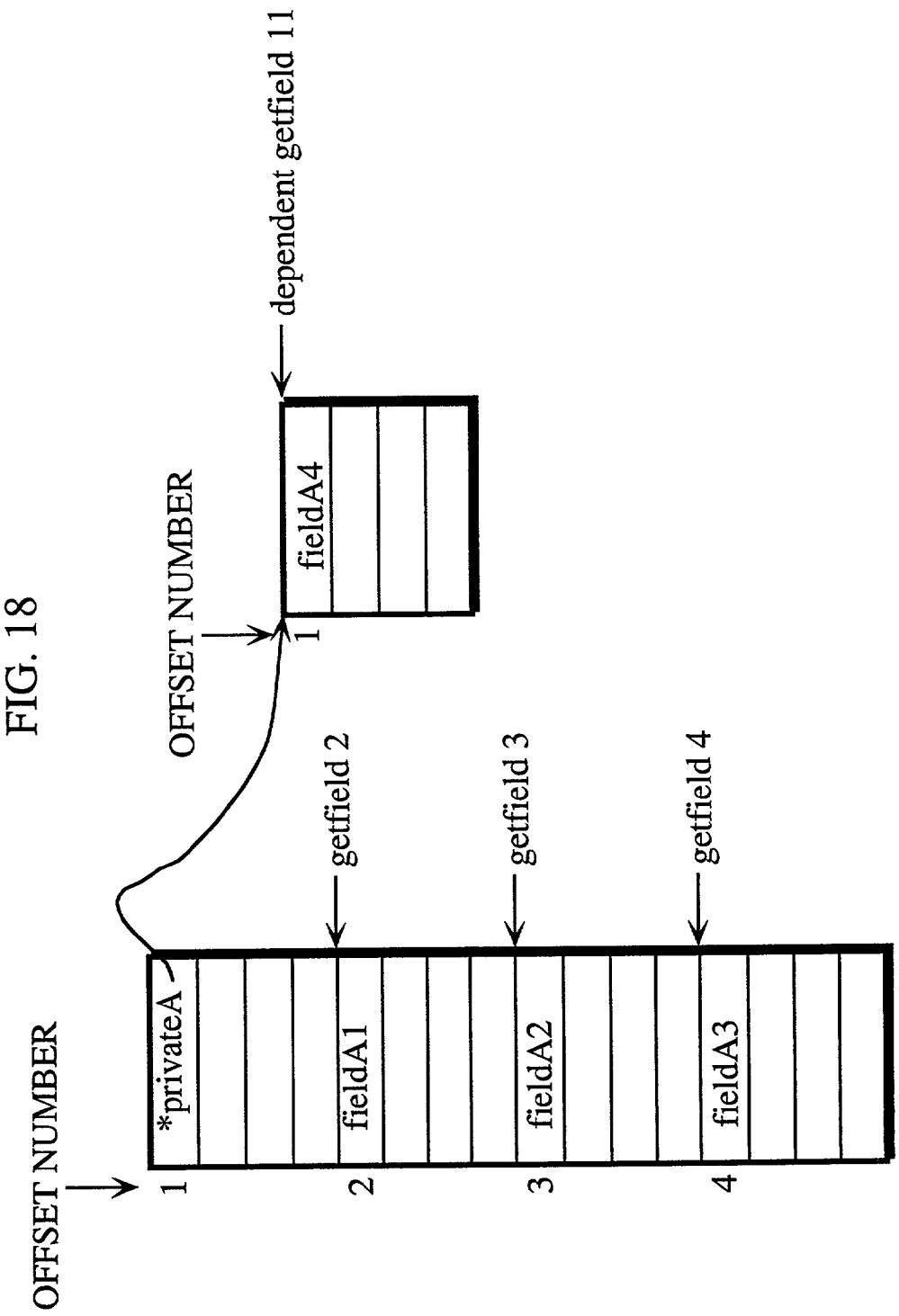
FIG. 18 shows operands of the getfield instruction after conversion.

FIG. 17 shows a Java program which is compiled to base class files. It should be noted here that FIG. 17 shows only definitions of fields and omits descriptions concerning specific uses. FIG. 18 shows the operands of the getfield instruction after the above conversion, corresponding to the instance fields shown in FIG. 17. Note that this applies to the operands of the putfield instruction.

As shown in FIG. 17, class A defines class-design-non-dependent fields "fieldA1", "fieldA2" and "fieldA3", and class-design-dependent field "fieldA4". The instruction conversion unit 14 converts operands <A.fieldA1>, <A.fieldA2>, and <A.fieldA3> of the getfield instruction corresponding to "fieldA1", "fieldA2", and "fieldA3" and indicating offsets in the constant pool into offset numbers "2", "3", and "4" identifying instance fields in the instance area. The instruction conversion unit 14 also converts "getfield <A.fieldA4>" into "dependent getfield 1 1" using prefix "dependent", where operand <A.fieldA4> of the getfield instruction corresponds to "fieldA4" and indicates an offset in the constant pool. Here, the first operand in the getfield instruction indicates an offset number in the class-design-non-dependent field, and the second operand indicates an offset number in the class-design-dependent field.

More specifically, as shown in FIG. 19A, in the class file for the base class Built_in_classY for the terminal A, operand <Built_in_classY.fieldU1> of the putfield instruction and operand <Built_in_classY.privateY1> of the getfield instruction indicate offsets in the constant pool. The instruction conversion unit 14 converts the offsets into offset numbers that identify instance fields in the instance field, based on the above described instance field offset tables. The instruction conversion unit 14 also converts operand <Built_in_classY> of the "new" instruction into a certain number. As a result of this, the class file shown in FIG. 19B is obtained.

1.5 Class ID Correspondence Table

The class ID correspondence table is a data table that stores class names and class IDs which are corresponded to each other.

The class ID (class identifier) is a number used for identifying a class in the light-weight class file. Each class ID uniquely corresponds to a class. Base classes are assigned with serial numbers from "1" to "7FFF". User classes are assigned with serial numbers from "8001" to "FFFF".

The class ID correspondence table is used by the instruction conversion unit 14 when it converts the "new" instruction. The class ID is discarded when the static linkage unit 12 ends processing.

FIGS. 20 and 21 show class ID correspondence tables. The base class ID correspondence table shown in FIG. 20 stores class names and class IDS of base classes, the class names and class IDs being corresponded to each other. The user class ID correspondence table shown in FIG. 21 stores class names and class IDs of user classes, the class names and class IDs being corresponded to each other.

1.6 Field Count Table

The field count table is classified into a class-design-non-dependent field count table and a class-design-dependent field count table.

(1) Class-Design-Non-Dependent Field Count Table

The class-design-non-dependent field count table is a data table that stores class IDs, non-dependent field counts, and super class IDs corresponded to each other.

The class IDs have been described earlier.

The non-dependent field count indicates the number of non-dependent fields in a class identified by the class ID.

The super class ID indicates a class ID of a super class of a class identified by the class ID.

FIGS. 22 and 23 show class-design-non-dependent field count tables.

The class-design-non-dependent field count table shown in FIG. 22 corresponds to a light-weight base class file common to the terminal apparatuses A and B.

The class-design-non-dependent field count table shown in FIG. 23 corresponds to a light-weight user class file common to the terminal apparatuses A and B.

(2) Class-Design-Dependent Field Count Table

The class-design-dependent field count table is a data table that stores class IDs, non-dependent field offsets, dependent field counts, and super class IDs corresponded to each other.

The class IDs have been described earlier.

The non-dependent field offset indicates an offset number of a non-dependent field in a class identified by the class ID.

The dependent field count indicates the number of dependent fields in a class identified by the class ID.

The super class ID indicates a class ID of a super class of a class identified by the class ID.

FIGS. 24A and 24B show class-design-dependent field count tables.

The class-design-dependent field count table shown in FIG. 24A corresponds to a light-weight base class file for the terminal apparatus A.

The class-design-dependent field count table shown in FIG. 24B corresponds to a light-weight base class file for the terminal apparatus B.

1.7 Operation of Program Execution System 1

The operation of program execution system 1 is achieved when the program generation apparatus 10 and the terminal apparatus 20 exercise the control shown in the flowcharts of FIGS. 25 to 30.

(1) Operation of Linkage to Base Class File

Figure 25:
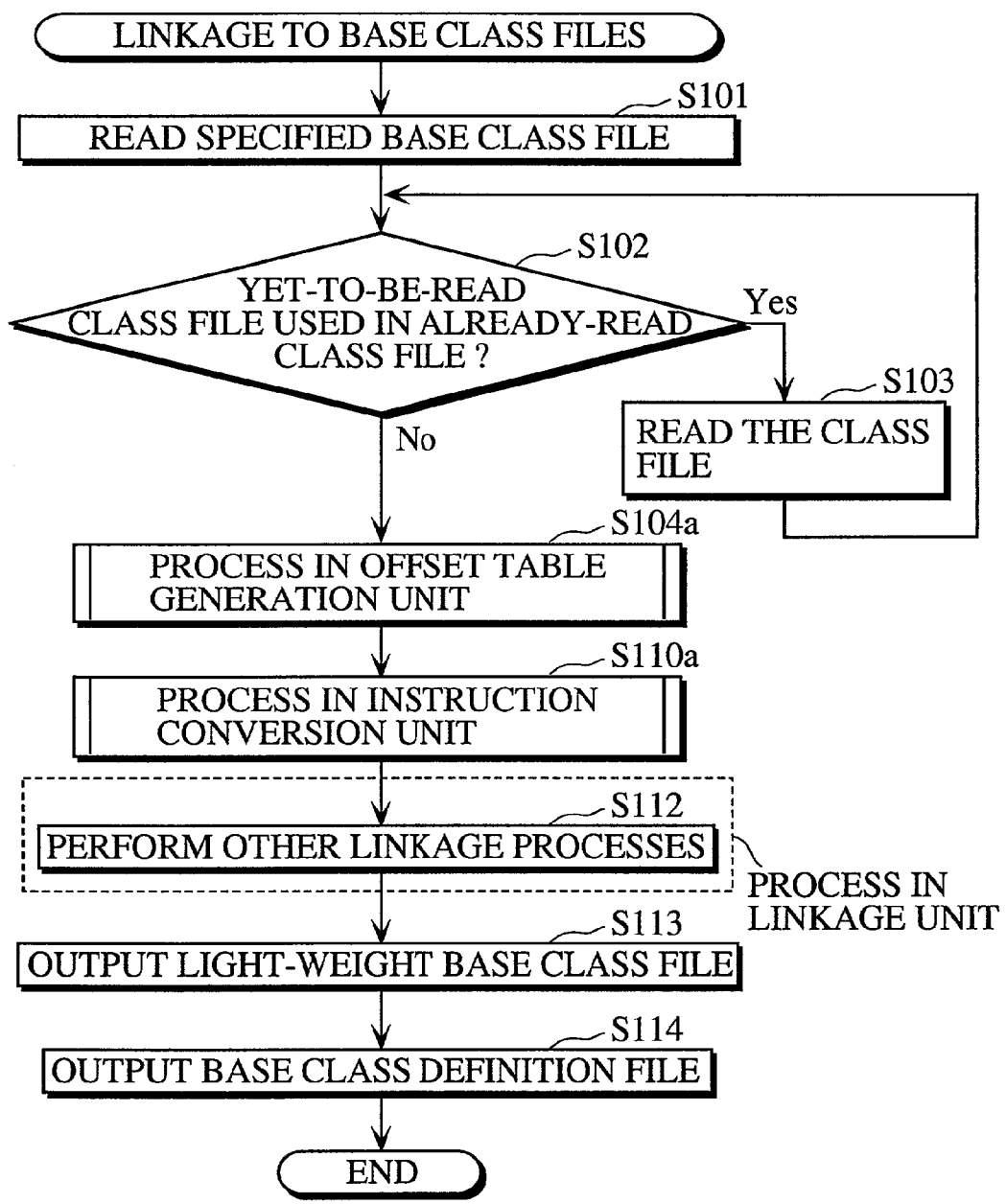
FIG. 25 is a flowchart showing the procedure of linkage for base class files.

The procedure for the linkage to the base class files will be described using the flowcharts shown in FIGS. 25 to 27.

The static linkage unit 12 reads a base class file specified by a user (step S101), judges whether a yet-to-be-read class file is used in an already-read class file. When judging positively ("Yes" in step S102), the static linkage unit 12 reads the yet-to-be-read class file (step S103), returns to step S102 and repeats reading a base class file until it judges negatively in step S102.

When judging that a yet-to-be-read class file is not used in an already-read class file ("No" in step S102), the offset table generation unit 13 generates an offset table (step S104a). The instruction conversion unit 14 performs the instruction conversion process (step S104a). The linkage unit 15 performs other linkage processes (step S112). The static linkage unit 12 writes a light-weight base class file into a storage unit (step S113), and writes a base class definition file into a storage unit (step S114).

In this way, the linkage process for base class files is performed to generate a light-weight base class file and a base class definition file.

Operation of Offset Table Generation Unit 13

Now, the offset table generation process in step S104a of the above procedure will be described in detail using the flowchart shown in FIG. 26.

The offset table generation unit 13 picks up a class, among read classes, for which the instance field offset table has not been generated, and sets the picked-up class as a target (step S104). The offset table generation unit 13 then judges whether it is true that the target class does not have a super class. When the target class has a super class, the offset table generation unit 13 judges whether the instance field offset table has been generated for the super class (step S105).

When judging positively in step S105, the offset table generation unit 13 assigns a class ID, which is one of serial numbers starting with "1", to the target class (step S107a), writes the name and ID of the target class into the base class ID correspondence table shown in FIG. 20 (step S107b), writes a pointer to a dependent field and a non-dependent field of the target class into the class-design-non-dependent field offset table for the super class shown in FIG. 11, and outputs the class-design-non-dependent field offset table to the instruction conversion unit 14. In this step, when the target class does not have a super class, the offset table generation unit 13 generates a class-design-non-dependent field offset table from the non-dependent field of the target class (step S107c). The offset table generation unit 13 then writes the class ID, non-dependent field count, and super class ID of the target class into the class-design-non-dependent field count table shown in FIG. 22. In doing this, the non-dependent field count is obtained by counting the non-dependent fields based on the class-design-non-dependent field offset table, including the number of pointer areas and non-dependent fields which are inherited from other classes (step S107d).

The offset table generation unit 13 then generates the class-design-dependent field offset table shown in FIG. 12 using only dependent fields of the target class, and outputs the table to the instruction conversion unit 14 (step S108a). The offset table generation unit 13 writes the class ID, non-dependent field offset, non-dependent field count, and super class ID of the target class into the class-design-dependent field count table shown in FIG. 24. In doing this, the non-dependent field count is obtained by counting only the dependent fields of the target class based on the generated class-design-dependent field offset table. When the target class does not have a super class, the offset table generation unit 13 writes "0" as the super class ID (step S108b).

The offset table generation unit 13 then judges whether there is a class for which the instance field offset table has not been generated. When judging it positively ("Yes" in step S109), the offset table generation unit 13 returns to step S104 to repeat the above steps; and when judging it negatively, the offset table generation unit 13 ends the process.

When judging negatively in step S105, the offset table generation unit 13 sets the super class as a target (step S106), and returns to step S105.

Operation of Instruction Conversion Unit 14

The instruction conversion in step S110a will be described in detail with reference to the flowchart shown in FIG. 27.

The instruction conversion unit 14 judges whether there is an unconverted operand of the getfield or putfield instruction. When judging it positively ("Yes" in step S110), the instruction conversion unit 14 judges whether the instruction including the operand is a dependent field access instruction. When judging it positively ("Yes" in step S111a), the instruction conversion unit 14 performs the instruction conversion by adding the dependent modification instruction to the access instruction, and referring to the dependent field count table of the target class to set the non-depended field offset to the first operand, and referring to the dependent field offset table of the target class to set the depended field offset to the second operand (step S111c), and then returns to step S110.

When judging it negatively in step S111a, the instruction conversion unit 14 performs the instruction conversion by referring to the non-dependent field offset table of the target class to set the non-dependent field offset to the first operand (step S111b), and then returns to step S110.

When judging it negatively in step S110, the instruction conversion unit 14 judges whether there is a "new" instruction yet to be processed. When judging it positively ("Yes" in step S111d), the instruction conversion unit 14 refers to the class ID table to perform the instruction conversion by changing the class name to the class ID (step S111e), and then returns to step S111d.

When judging negatively in step S111d, the instruction conversion unit 14 writes the non-dependent field count table and the dependent field count table (step S111f), and ends the process of the instruction conversion unit 14.

(2) Operation of Linkage to User Class File

Figure 28:
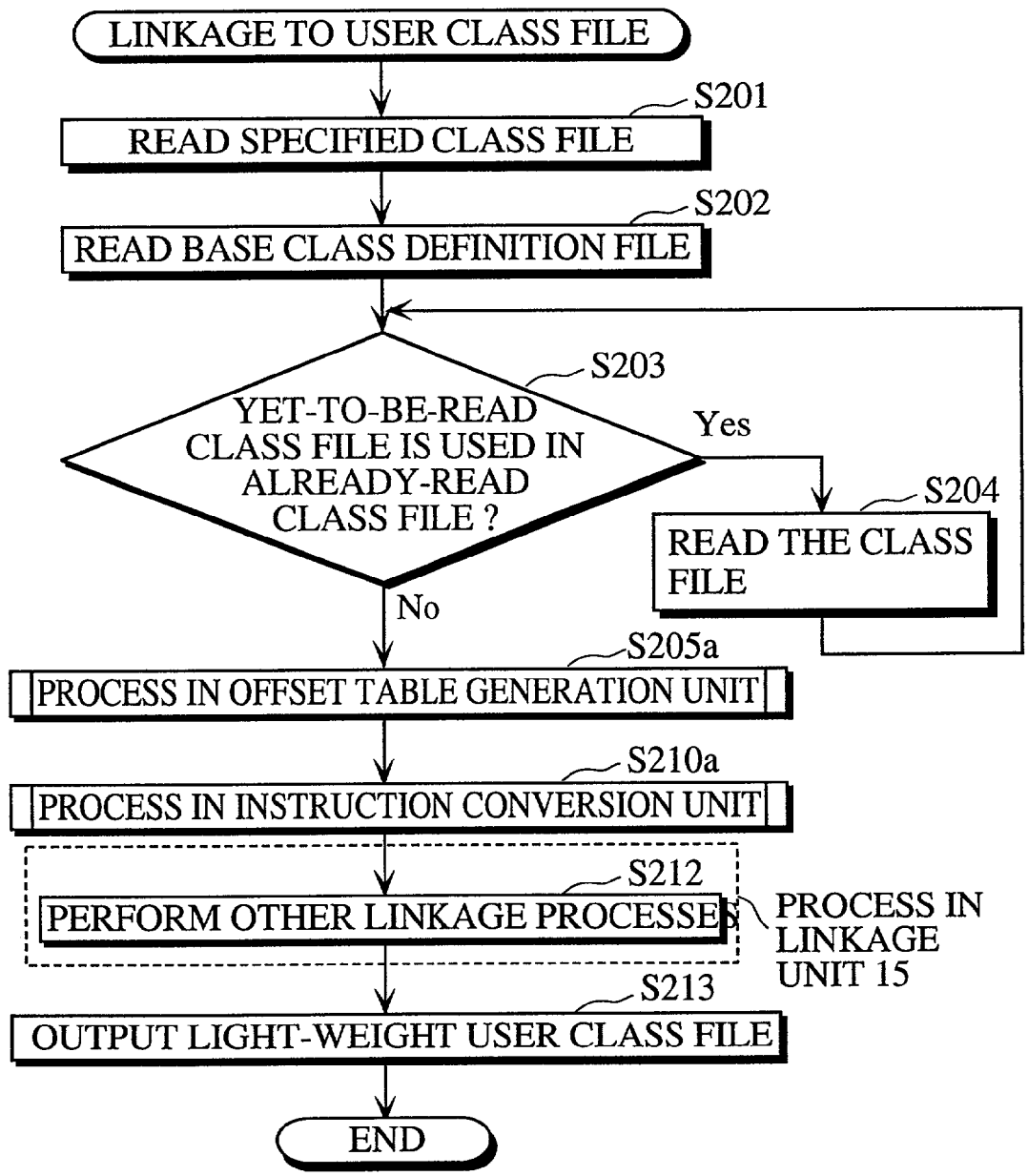
FIG. 28 is a flowchart showing the procedure of linkage for user class files.

The procedure for the linkage to the user class files will be described using the flowcharts shown in FIGS. 28 to 30.

The static linkage unit 12 reads a user class file specified by a user (step S201), reads a base class definition file (step S202), judges whether a yet-to-be-read class file is used in an already-read class file. When judging positively ("Yes" in step S203), the static linkage unit 12 reads the yet-to-be-read class file (step S204), returns to step S203 and repeats reading a user class file until it judges negatively in step S203.

When judging that a yet-to-be-read class file is not used in an already-read class file ("No" in step S203), the offset table generation unit 13 generates an offset table (step S205a). The instruction conversion unit 14 performs the instruction conversion process (step S210a). The linkage unit 15 performs other linkage processes (step S212). The static linkage unit 12 writes a light-weight user class file into a storage unit (step S213).

In this way, the linkage process for user class files is performed to generate a light-weight user class file.

Operation of Offset Table Generation Unit 13

Now, the offset table generation process in step S205a of the above procedure will be described in detail using the flowchart shown in FIG. 29.

The offset table generation unit 13 picks up a class, among read classes, for which the instance field offset table has not been generated, and sets the picked-up class as a target (step S205). The offset table generation unit 13 then judges whether the super class of the target class is a base class. When judging it positively ("Yes" in step S206a), the offset table generation unit 13 generates a class-design-non-dependent field offset table for the super class from the base class definition file (step S206b), and moves to step S208a.

When judging negatively in step S206a, the offset table generation unit 13 judges whether the instance field offset table has been generated for the super class of the target class. When judging it positively ("Yes" in step S206c), the offset table generation unit 13 moves to step S208a.

When judging negatively in step S206c, the offset table generation unit 13 sets the super class as a target (step S207), and returns to step S206a.

The offset table generation unit 13 assigns a class ID, which is one of serial numbers starting with "8001", to the target class (step S208a), writes the name and ID of the target class into the user class ID correspondence table shown in FIG. 21 (step S208b), writes a non-dependent field of the target class into the class-design-non-dependent field offset table for the super class shown in FIG. 13, and outputs the class-design-non-dependent field offset table to the instruction conversion unit 14 (step S208c). The offset table generation unit 13 then writes the class ID, non-dependent field count, and super class ID of the target class into the class-design-non-dependent field count table shown in FIG. 23. In doing this, the non-dependent field count is obtained by counting the non-dependent fields based on the class-design-non-dependent field offset table generated in step S208c, including the number of non-dependent fields which are inherited from other classes (step S208d).

The offset table generation unit 13 then judges whether there is a class for which the instance field offset table has not been generated. When judging it positively ("Yes" in step S209 the offset table generation unit 13 returns to step S205 to repeat the above steps; and when judging it negatively, the offset table generation unit 13 ends the process.

Operation of Instruction Conversion Unit 14

The instruction conversion in step S210a will be described in detail with reference to the flowchart shown in FIG. 30.

The instruction conversion unit 14 judges whether there is an unconverted operand of the getfield or putfield instruction. When judging it positively ("Yes" in step S210), the instruction conversion unit 14 performs the instruction conversion by referring to the non-dependent field offset table of the target class to set the non-depended field offset to the first operand (step S211a), and then returns to step S210.

When judging it negatively in step S210, the instruction conversion unit 14 judges whether there is a "new" instruction yet to be processed. When judging it positively ("Yes" in step S211b), the instruction conversion unit 14 refers to the class ID table to perform the instruction conversion by changing the class name to the class ID (step S211c), and then returns to step S211b.

When judging negatively in step S211c, the instruction conversion unit 14 writes the non-dependent field count table (step S211d), and ends the process of the instruction conversion unit 14.

Brief Account

When the class-design-non-dependent field offset table shown in FIG. 13 is generated for a target class, offset numbers are uniquely assigned in series to class-design-non-dependent fields of each class, and an instance is generated by allocating an area for storing a pointer pointing to a class-design-dependent field offset table. Especially, when a class inherits instance fields from its super class, the same offset numbers as the super class are assigned to the instance fields of the class.

The program execution system 1 uses different tables to manage (a) class-design-dependent fields inherited from a base class and (b) class-design-non-dependent fields inherited from a base class and newly defined. When the static linkage unit 12 performs a linkage process to a user class file, the offset table generation unit 13 allocates a fixed-length area in a class-design-non-dependent field offset table for storing a pointer that points to an area corresponding to a class-design-dependent field offset table when an instance is generated.

The above area for storing a pointer is allocated in each class-design-non-dependent field offset table in a same manner regardless of the types of the terminal apparatuses. Therefore, the class-design-non-dependent field offset tables do not depend on the types of the terminals. When a light-weight user class file is generated, only class-design-non-dependent field offset tables are generated, and the dependent table generation unit 132 is not used.

In contrast, when a linkage process to a base class file is performed, the base class definition file is not read, and only the base class file is read. Also, the non-dependent table generation unit 131 generates (a) the class-design-non-dependent field offset tables shown in FIG. 11 and (b) the class-design-dependent field offset tables shown in FIG. 12 which are different for each type of terminal apparatus. As a result of such a linkage process, light-weight class files and base class definition files are output.

(3) Operation of Instruction Execution by Terminal Apparatus 20

The procedure for the instruction execution process performed by the terminal apparatus 20 will be described using the flowcharts shown in FIGS. 31 to 32.

The instruction execution unit 21 reads a light-weight user class file specified by the terminal apparatus 20 into the memory (step S331). The instruction execution unit 21 then judges whether all the instructions in the light-weight user class file in the memory have been selected. When judging it positively ("Yes" in step S300), the instruction execution unit 21 ends the process.

When judging it negatively ("No" in step S300), the instruction execution unit 21 selects the first instruction among instructions in the light-weight user class file (step S301).

Executing Outfield Instruction (Getfield Instruction)

The instruction execution unit 21 judges whether the selected instruction is the putfield (or getfield) instruction. When judging it positively ("Yes" in step S302), the instruction execution unit 21 judges whether "dependent" is attached to the selected instruction (step S314).

When judging positively in step S314, the instruction execution unit 21 obtains the address of area Y that stores a pointer pointing to a dependent field area, by adding the first operand (a non-dependent field offset) of the selected instruction to an address of an instance in a stack (step S315). The instruction execution unit 21 then obtains the address of area X that is a target of the putfield (getfield) instruction, by adding the second operand (a dependent field offset) of the selected instruction to an address pointed to by the pointer in the area Y (step S316).

When judging negatively in step S314, the instruction execution unit 21 obtains the address of area X by adding the first operand (a non-dependent field offset) of the selected instruction to an address of an instance in a stack (step S313).

The instruction execution unit 21 then executes the putfield (getfield) instruction for the area X, and returns to step S301 to repeat the above steps.

Executing "New" Instruction

The instruction execution unit 21 judges whether the selected instruction is the "new" instruction. When the instruction execution unit 21 judges it positively ("Yes" in step S303), the instruction generation unit 22 selects a class identified by an ID indicated by an operand of the "new" instruction, as a target class (step S304). The instruction generation unit 22 then reads the class-design-non-dependent field count table from the light-weight user class file, and allocates an area X in a memory having a size enough to store as many fields as indicated by the non-dependent field count for the target class (step S305).

The instruction generation unit 22 then judges whether the target class is a base class by judging whether the class ID is 7FFF or lower. When the target class is not a base class ("No" in step S306), the instance generation unit 22 identifies a super class by referring to the non-dependent field count table for the light-weight user class file, and sets the identified super class as a target (step S307), and returns to step S306 to repeat the steps.

When the target class is a base class ("Yes" in step S306), the instance generation unit 22 reads the class-design-dependent field count table from the light-weight base class file, and allocates an area Y in a memory having a size enough to store as many fields as indicated by the dependent field count for the target class (step S308a), and stores the pointer pointing to the area Y, into an area in the area X indicated by the non-dependent field offset (step S308b).

The instance generation unit 22 judges whether the target class has a super class by judging whether it is true that the super class ID in the dependent field count table is not "0". When judging it positively ("Yes" in step S309), the instance generation unit 22 identifies a super class by referring to the dependent field count table for the light-weight base class file, and sets the identified super class as a target (step S311), and returns to step S308a to repeat the steps.

When judging negatively ("No" in step S309), the instance generation unit 22 puts the pointer pointing to the area X onto the stack (step S310), and returns to step S301 to repeat the steps.

Executing Other Instructions

When the selected instruction is not the "new" instruction ("No" in step S303), the instruction execution unit 21 executes the selected instruction in the same way as conventional virtual machines (step S312), and returns to step S301 to repeat the steps.

Brief Account

The program execution system 1 uses different tables to manage (a) class-design-dependent fields inherited from a base class and (b) class-design-non-dependent fields inherited from a base class and newly defined. When a user class file inherits a base class file that uses a class-design-dependent field, the instance generation unit 22, during an execution of an instruction, allocates different areas to the class-design-non-dependent field offset table and to the class-design-dependent field offset table, and stores a pointer that points to an area corresponding to the class-design-dependent field offset table, into a pointer area in an area corresponding to the class-design-non-dependent field offset table.

Each class-design-non-dependent field offset table has a pointer area which is identified in the same manner regardless of the terminal apparatus type. As a result, the instance field offset numbers for the class-design-non-dependent fields do not dependent on the terminal type. This enables different types of terminal apparatuses to access the class-design-non-dependent fields of each terminal apparatus, using the same instance field offset numbers. As described earlier, the light-weight user class files including generated count tables do not depend on the type of each terminal. It is therefore possible for the same light-weight user class files to be used by different types of terminal apparatuses.

In the present embodiment, it is supposed that the instance generation unit 22 of the terminal apparatus 20 in the program execution system 1 allocates an area with the same size to each instance area regardless of the field type. However, the program execution system 1 may allocate an area with a different size to each instance area according to the field type.

1.8 EXAMPLES

Examples of Java programs used in the program system 1 and generated instances will be described.

(1) Example 1

Figure 34:
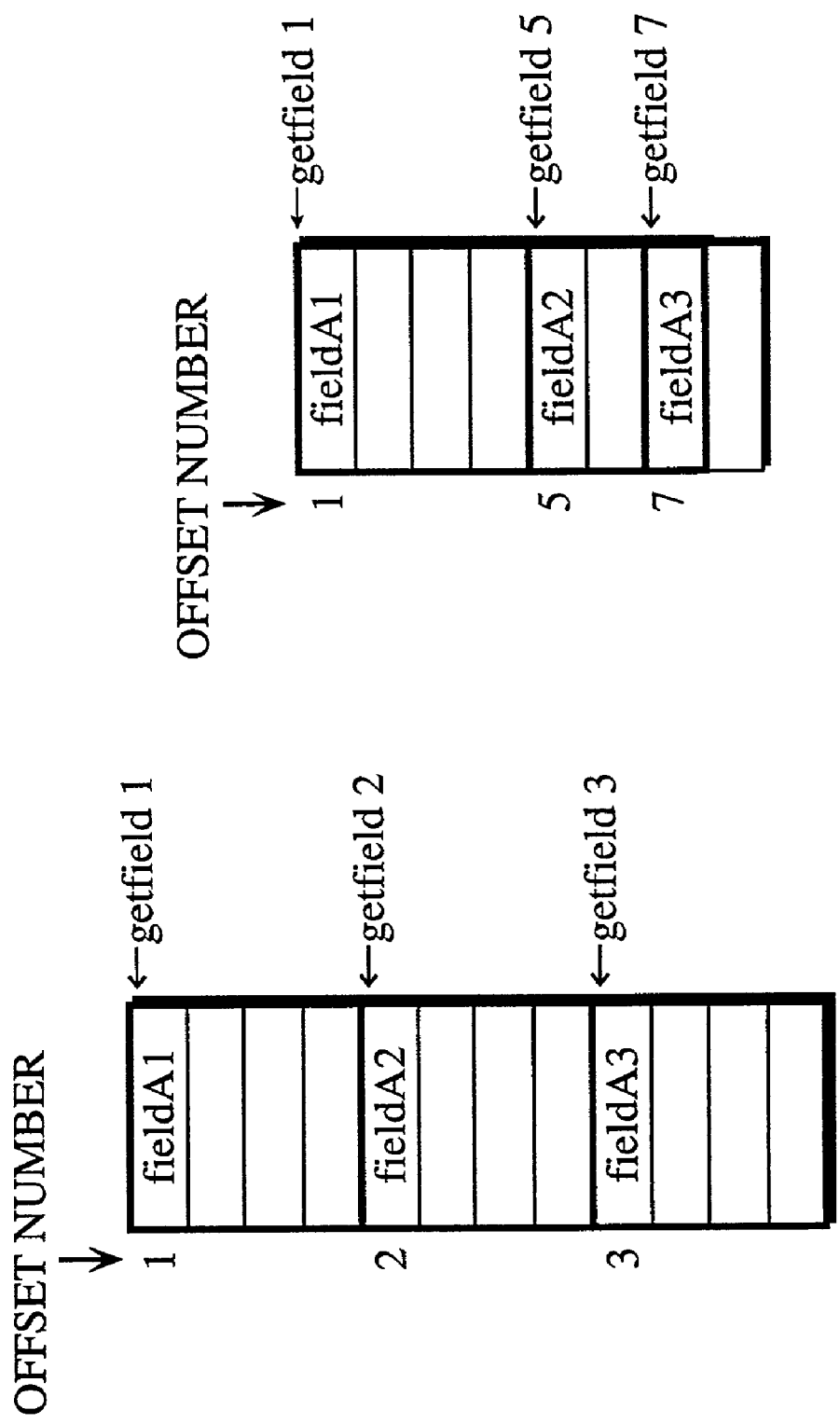
FIG. 34A shows an instance generated in the program execution system 1 to correspond to the Java program shown in FIG. 33.
FIG. 34B shows an instance generated in another program execution system to correspond to the Java program shown in FIG. 33.

FIG. 33 shows an example of a Java program from which class files are generated via compilation. FIG. 34A shows an instance generated in the program execution system 1 to correspond to the Java program shown in FIG. 33.

As shown the Java program shown in FIG. 33, class A defines instance fields: int-type "fieldA1", short-type "fieldA2", and byte-type "fieldA3".

In the program execution system 1, it is supposed that the instance shown in FIG. 34A is generated in correspondence to the above instance fields. In this case, an area with the same size is allocated to each of "fieldA1", "fieldA2", and "fieldA3" regardless of the field type.

On the other hand, in the same program execution system, it is possible to generate the instance shown in FIG. 34B. In this case, an area with a different size is allocated to each of "fieldA1", "fieldA2", and "fieldA3" according to the field type, and an offset number is assigned to each field so that the position of the instance area can be identified.

In the program execution system 1 of the present embodiment, it is supposed that a light-weight class file including a count table including the count of instance fields is transferred to a terminal apparatus, and that the table is referred to when the getfield or putfield instruction is executed. However, the light-weight class file may not include such an instance field offset table, and the getfield instruction and the putfield instruction may include information of an operand type.

(2) Example 2

FIG. 35 shows an example of a Java program from which class files are generated via compilation. FIG. 36A shows operands of the getfield instruction after conversion which correspond to the Java program shown in FIG. 35. This also applies to the operands of the putfield instruction.

It is supposed here that only information indicating the size of the whole instance area is transferred from a program generation apparatus to a terminal apparatus so that the terminal apparatus generates an instance using the "new" instruction. In this example, it is supposed that an instance area with a different size is allocated to each instance field according to the field type. However, an instance area with the same size may be allocated to each instance field regardless of the field type.

As shown in FIG. 35, class A defines byte-type instance field "fieldA1" and short-type instance field "fieldA2", and class B defines int-type "fieldB1". In this example, the operands in the getfield instruction in each class file are converted into instructions as follows: 1-byte (byte-type) operands are converted into getfield_b instructions; 2-byte (short-type) operands are converted into getfield_s instructions; and 4-byte (int-type or reference-type) operands are converted into getfield instructions.

As shown in FIG. 36A, offset numbers "1" and "3" are assigned to fieldA1 and fieldA2 of class A, respectively, and the getfield_b instruction or the getfield_s instruction is used according to the field type.

Figure 36B:
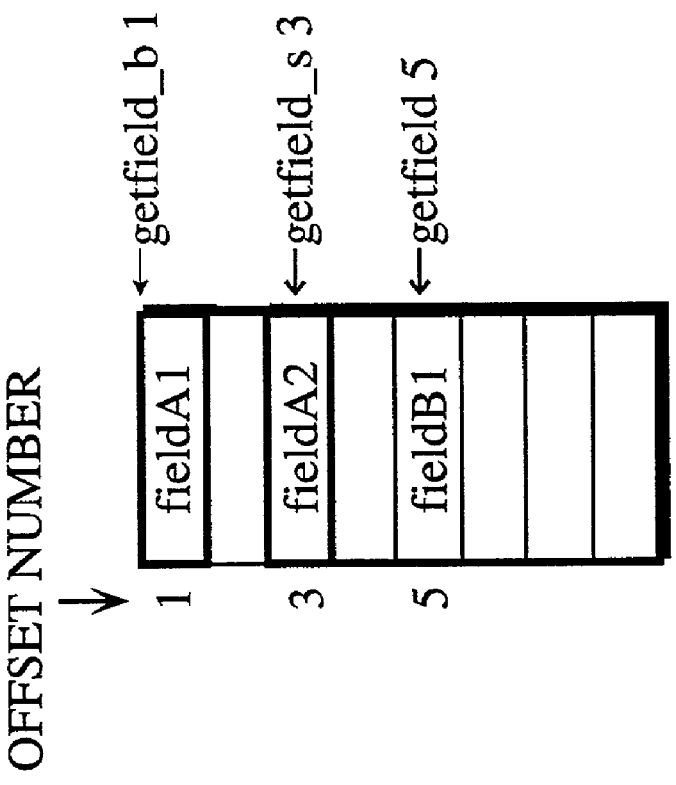
FIG. 36B shows operands of the getfield instruction after conversion which correspond to the Java program shown in FIG. 35 for class B.
Figure 36A:
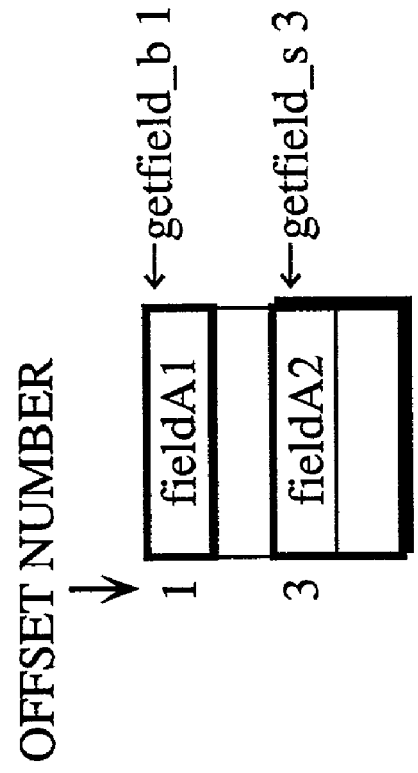
FIG. 36A shows operands of the getfield instruction after conversion which correspond to the Java program shown in FIG. 35 for class A.

As shown in FIG. 36B, offset numbers "1" and "3" are assigned to fieldA1 and fieldA2 of class B in the same way as class A, where these fields have been inherited from class A. In addition, an offset number "5" is assigned to fieldB1 which is newly defined. One of the getfield_b, getfield_s, and getfield instructions is used according to the field type.

1.9 Brief Account

As described above, the program execution system 1 extends the function of the light-weight base class library to achieve a desired operation by allowing a plurality of different types of terminal apparatuses to execute the same light-weight user class file which is transferred between the terminal apparatuses regardless of the terminal apparatus type. This eliminates the necessity of generating different light-weight user class files according to the light-weight base class library of each terminal apparatus.

Although the program execution system 1 using light-weight class files is suitable for low-performance terminal apparatuses such as a computer-integrated system, the use of the same light-weight user class file in a plurality of terminal apparatuses reduces the load on the program developers.

In the program execution system 1, the class-design-dependent fields are grouped for each base class file, a class-design-dependent field offset table is generated for each base class file, a class-design-non-dependent field offset table is associated with each base class file to be inherited, and a pointer pointing to an area corresponding to a class-design-dependent field offset table is stored at the start of an area corresponding to each base class file in the class-design-non-dependent field offset table. However, the pointer pointing to the area corresponding to the class-design-dependent field offset table may be stored at the last of the area corresponding to each base class file in the class-design-non-dependent field offset table.

In the program execution system 1, it is supposed that each class is classified into a user class or a base class. However, an intermediate class, such as an information service class may be defined as well. In this case, it is defined that the user classes cannot use the class-design-dependent fields of the information service classes and the base classes and that the information service classes cannot use the class-design-dependent fields of the base classes.

In the program execution system 1, the modifier "private" is used to define the class-design-dependent field. However, another keyword may be used instead to achieve the class-design-dependent field.

In the program execution system 1, a class-design-dependent field offset table is provided for each base class file. It is also possible to provide a program execution system 2 in which the class-design-dependent fields of all the base class files to be inherited are written in one class-design-dependent field offset table. It is also possible to provide a program execution system 3 in which the maximum number of instance fields to be used is estimated, and areas for the instance fields are allocated in advance in the class-design-non-dependent field offset table. The following are descriptions of the program execution systems 2 and 3 as the second and third embodiments of the present invention.

2. Second Embodiment

The program execution system 2 will be described as the second embodiment of the present invention.

The program execution system 2 has the same construction and operates the same as the program execution system 1 except for the construction of the class-design-non-dependent field offset table and the class-design-dependent field offset table, and the operation related to this change in the construction.

Note that in the following description, as is the case with the conventional program execution system, it is supposed that the Java programs shown in FIGS. 1 to 3 are used via compilation.

2.1 Construction of Program Execution System 2

(a) Field Offset Table Corresponding to Base Class

FIG. 37 shows two class-design-non-dependent field offset tables that are generated to correspond to base classes. FIGS. 38A and 38B show class-design-dependent field offset tables that are generated to correspond to base classes.

As shown in the class-design-non-dependent field offset table shown in FIG. 37 that corresponds to the base class Built_in_classX, offset numbers "2" and "3" are assigned to the class-design-non-dependent fields "fieldX1" and "fieldX2", respectively, in the order of definition.

With the above construction, the operands written in the base class file and used in the getfield and putfield instructions to indicate "fieldX1" and "fieldX2" in the constant pool are written as "2" and "3", respectively, in the light-weight base class file when the terminal apparatus generates an instance, to indicate offsets with reference to the start of the instance area.

The "null" in the area in the "instance field" column corresponding to the field offset number "1" shows that the instance field "null" stores a pointer when a terminal apparatus generates an instance, the pointer pointing to an area corresponding to the class-design-dependent field offset table. The "null" used in the class-design-non-dependent field offset table means the same as the class-design-non-dependent field offset table for the base class Built_in_classX shown in FIG.

As shown in the class-design-non-dependent field offset table shown in FIG. 37 that corresponds to the base class Built_in classy, offset numbers "2", "3", "4", "5", and "6" are assigned, in the order of definition, to (1) the class-design-non-dependent fields "fieldX1" and "fieldX2" inherited from the base class Built_in_classX and (2) the class-design-non-dependent fields "fieldY1", "fieldY2", and "fieldY3" newly defined in the base class Built_in_classY.

With the above construction, the operands written in the base class file and used in the getfield and putfield instructions to indicate "fieldX1", "fieldX2", "fieldY1", "fieldY2", and "fieldY3" in the constant pool are written as "2", "3", "4", "5", and "6", respectively, in the light-weight base class file when the terminal apparatus generates an instance, to indicate offsets with reference to the start of the instance area.

The "null" in the area in the "instance field" column corresponding to the field offset number "1" in the class-design-non-dependent field offset table for the base class Built_in_classY shows that the instance field "null" stores a pointer when a terminal apparatus generates an instance, the pointer pointing to an area corresponding to the class-design-dependent field offset table.

The class-design-non-dependent field offset table for the base class Built_in_classY shown in FIG. 37 shows only one instance field "null" while the one shown in FIG. 11 includes two instance fields "null". That is to say, the class-design-non-dependent field offset table for the base class Built_in_classY shown in FIG. 37 provides only one area for storing a pointer pointing to an area corresponding to the class-design-dependent field offset table, covering the two base classes Built_in_classX and Built_in_classY. The class-design-non-dependent field offset table for the base class Built_in_classY shown in FIG. 37 also provides relationships between offset numbers and the class-design-dependent fields of these base classes successively.

These class-design-non-dependent field offset tables shown in FIG. 37 are common to the terminal apparatuses A and B. However, the terminal apparatuses A and B use different class-design-dependent field offset tables.

More specifically, for terminal apparatus A, class-design-dependent field offset tables shown in FIG. 38A are generated for the base classes, respectively. Also, for terminal apparatus B, class-design-dependent field offset tables shown in FIG. 38B are generated for the base classes, respectively. These class-design-dependent field offset tables shown in FIGS. 38A and 0.38B differ from those shown in FIGS. 12A and 12B in that each class-design-dependent field offset table for Built_in_classY includes the contents of the corresponding class-design-dependent field offset table for Built_in_classX.

(b) User Class Class-Design-Non-Dependent Field Offset Tables

Figure 40A:
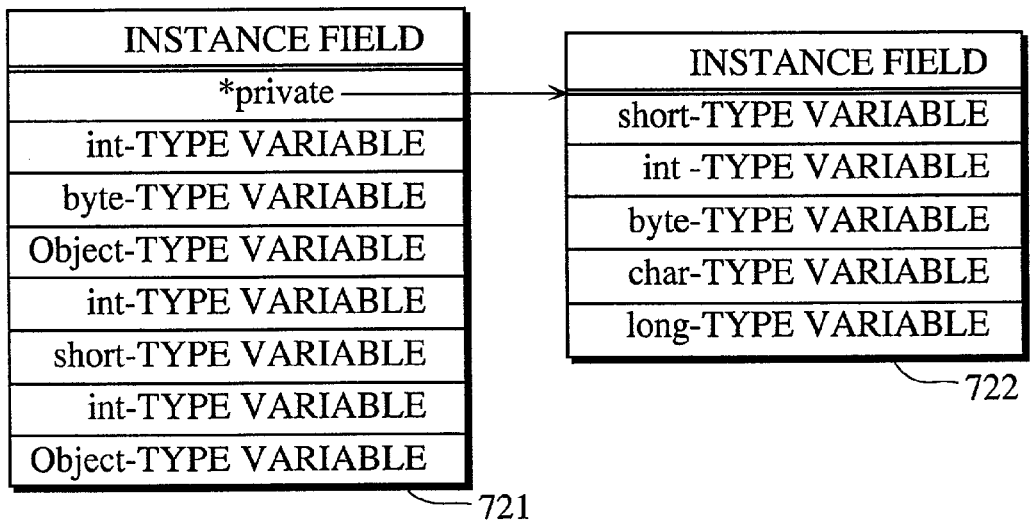
FIG. 40A shows an instance corresponding to the user classes User_class generated in the terminal apparatus A.
Figure 40B:
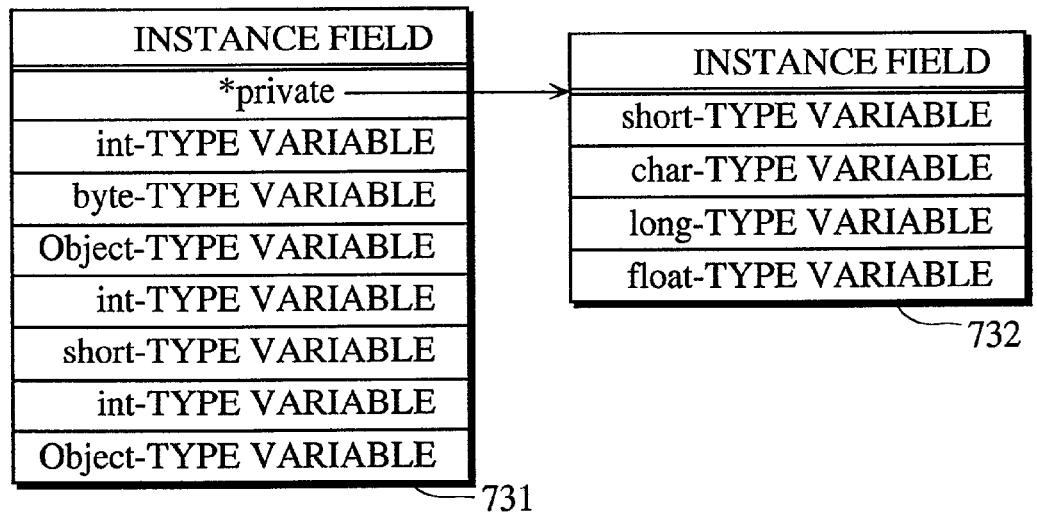
FIG. 40B shows an instance corresponding to the user classes User_class generated in the terminal apparatus B.

FIG. 39 shows the class-design-non-dependent field offset table corresponding to the user class User_class shown in FIG. 3. FIGS. 40A and 40B show the instances corresponding to the user classes User_class generated in the terminal apparatuses A and B, respectively.

As shown in the user class class-design-non-dependent field offset table shown in FIG. 39, offset numbers "2", "3", "4", "5", and "6" are assigned to the class-design-non-dependent fields inherited from the base class Built_in_classY, where the offset numbers are the same as those assigned for the base class Built_in_classY. In this table shown in FIG. 39, offset numbers "7" and "8" are also assigned to the class-design-non-dependent fields which are newly defined in this table.

In the user class class-design-non-dependent field offset table shown in FIG. 39, offset number "1" is assigned to the instance field "null". This indicates that the same pointer is stored in the same area as indicated in the class-design-non-dependent field offset table for the base class Built_in_classY.

As shown in FIG. 40A, a memory area 721 corresponding to the user class class-design-non-dependent field offset table shown in FIG. 39 is allocated for the terminal apparatus A. Then, a memory area 722 corresponding to the class-design-dependent field offset table for the base class Built_in_classY shown in FIG. 38A is allocated. The memory area 721 includes a pointer area corresponding to the instance field "null". A pointer is stored into the pointer area, where the pointer points to the memory area 722 that corresponds to the class-design-dependent field offset table for the base class Built_in_classy. In this way, instances for the terminal apparatus A are generated.

Similarly, as shown in FIG. 40B, a memory area 731 corresponding to the user class class-design-non-dependent field offset table shown in FIG. 39 is allocated for the terminal apparatus B. Then, a memory area 732 corresponding to the class-design-dependent field offset table for the base class Built_in_classY shown in FIG. 38B is allocated. The memory area 731 includes a pointer area corresponding to the instance field "null". A pointer is stored into the pointer area, where the pointer points to the memory area 732 that corresponds to the class-design-dependent field offset table for the base class Built_in_classY. In this way, instances for the terminal apparatus B are generated.

(c) Field Count Table

The field count tables used in the program execution system will be described.

Base Class Class-Design-non-Dependent Field Count Table

FIG. 41 shows a class-design-non-dependent field count table included in a light-weight base class file for the terminal apparatuses A and B.

The class-design-non-dependent field count table shown in FIG. 41 includes class IDs, non-dependent field counts, and super class IDs. The class IDs, non-dependent field counts, and super class IDs will not be detailed here since they have already been explained earlier.

Base Class Class-Design-Dependent Field Count Table

FIGS. 42A and 42B show class-design-dependent field count tables included in light-weight base class files for the terminal apparatuses A and B.

These class-design-dependent field count tables each include class IDs and dependent field counts. The class IDs and dependent field counts will not be detailed here since they have already been explained earlier.

User Class Class-Design-Non-Dependent Field Count Table

FIG. 43 shows a class-design-non-dependent field count table included in a light-weight user class file for the terminal apparatuses A and B.

The class-design-non-dependent field count table includes class IDs, non-dependent field counts, and super class IDs. The class IDs, non-dependent field counts, and super class IDs will not be detailed here since they have already been explained earlier.

(d) Specific Examples of Instruction Conversion

Specific examples of instruction conversion will be shown.

As shown in FIG. 44A, in the class file, before conversion, for the base class Built_in_classY for the terminal apparatus A, operand <Built_in_classY.fieldY1> of the putfield instruction and operand <Built_in_classY.privateY1> of the putfield instruction indicate offsets in the constant pool. The instruction conversion unit of the program execution system 2 converts the offsets into offset numbers that identify instance fields in the instance area, based on the above described instance field offset tables. The instruction conversion unit also converts operand <Built_in_classY> of the "new" instruction into a certain number. As a result of this, the class file shown in FIG. 44B is obtained. As shown in FIG. 44B, each operand of the putfield and getfield instructions is converted into "4". Also, "dependent" is attached to the putfield instruction.

As shown in FIG. 45A, in the class file, before conversion, for an ordinary Java user class, operand <User_class.fieldU1> of the putfield instruction indicates an offset in the constant pool. The instruction conversion unit of the program execution system 2 converts the offset into an offset number that identifies an instance field in the instance area, based on the above described instance field offset tables. The instruction conversion unit also converts operand <User_class> of the "new" instruction into a certain number. As a result of this, the class file shown in FIG. 45B is obtained. As shown in FIG. 45B, the operand of the putfield instruction is converted into

2.2 Operation of Program Execution System 2

The operation of the program execution system 2 will be described. Here, what is different from the program execution system 1 will be mainly described.

(1) Operation of Linkage to Base Class File

The procedure for the linkage to the base class files will be described.

Operation of Offset Table Generation Unit 13

The offset table generation process performed by the offset table generation unit 13 of the program execution system 2 in step S104a will be detailed with reference to the flowchart shown in FIG. 46.

Figure 26:
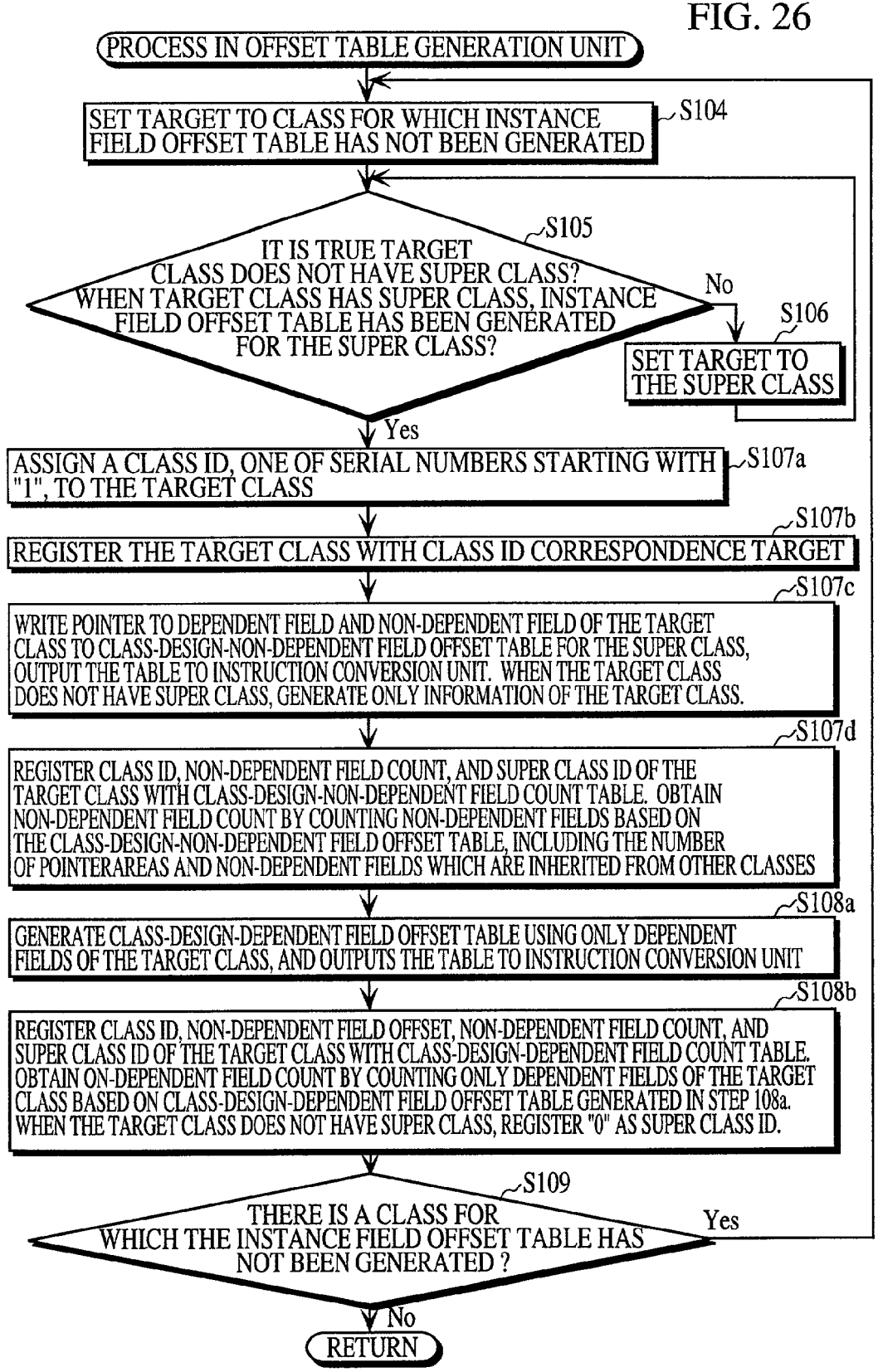
FIG. 26 is a flowchart showing a detailed procedure of offset table generation.
Figure 46:
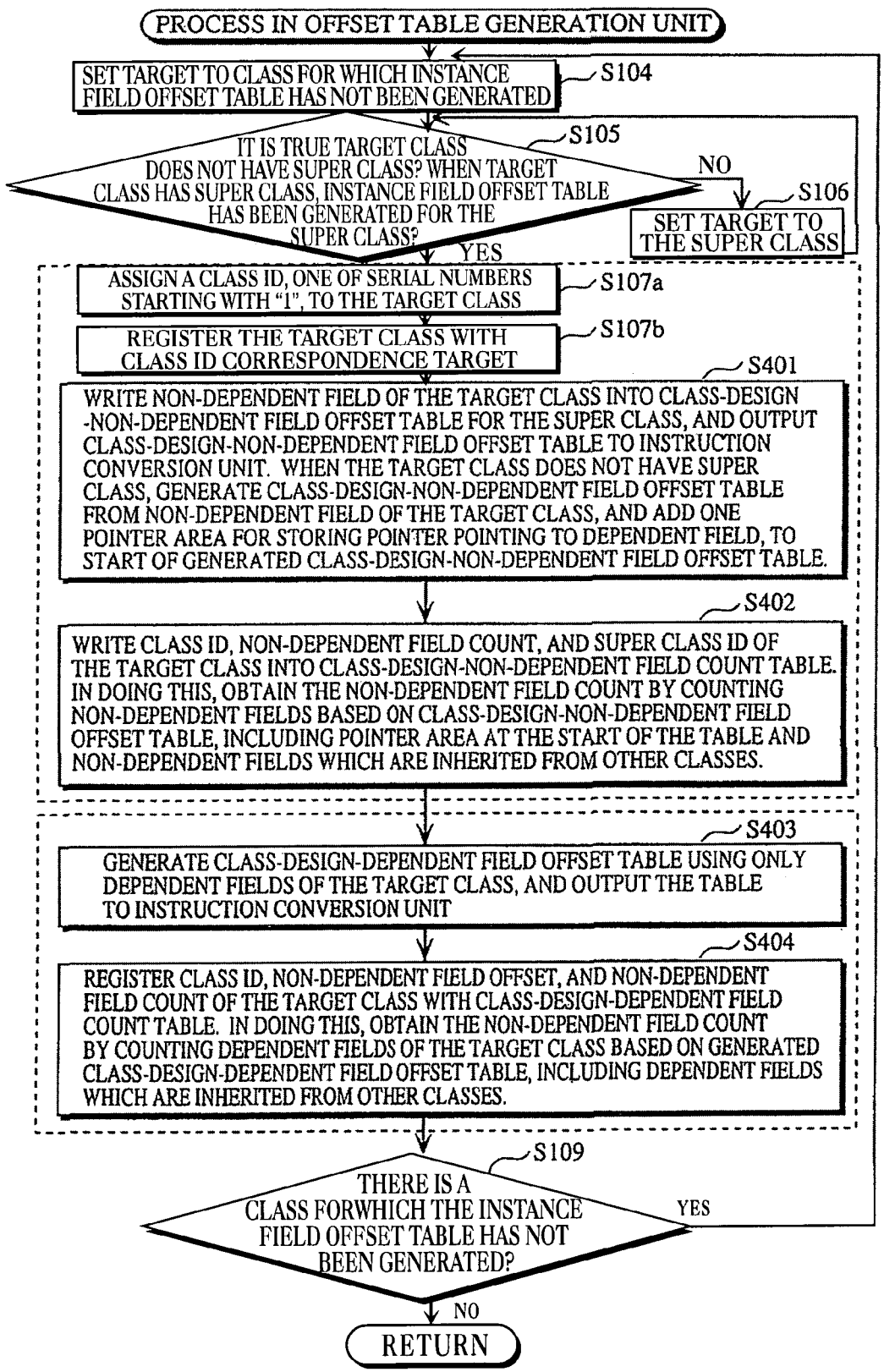
FIG. 46 is a flowchart showing a detailed procedure of offset table generation by the offset table generation unit 13 in the program execution system 2 during linkage to base class files.

The steps in FIG. 46 having the same numbers as the flowchart shown in FIG. 26 will not be explained here since the same operations are performed in these steps.

After step S107b is completed, the offset table generation unit 13 writes a non-dependent field of the target class into the class-design-non-dependent field offset table for the super class shown in FIG. 37, and outputs the class-design-non-dependent field offset table to the instruction conversion unit 14. In this step, when the target class does not have a super class, the offset table generation unit 13 generates a class-design-non-dependent field offset table from the non-dependent field of the target class, and adds one pointer area for storing a pointer pointing to a dependent field, to the start of the generated class-design-non-dependent field offset table (step S401). The offset table generation unit 13 then writes the class ID, non-dependent field count, and super class ID of the target class into the class-design-non-dependent field count table shown in FIG. 41. In doing this, the non-dependent field count is obtained by counting the non-dependent fields based on the class-design-non-dependent field offset table, including the pointer area at the start of the table and non-dependent fields which are inherited from other classes (step S402).

The offset table generation unit 13 then generates the class-design-dependent field offset table shown in FIG. 38 using only dependent fields of the target class, and outputs the table to the instruction conversion unit 14 (step S403). The offset table generation unit 13 writes the class ID, non-dependent field offset and non-dependent field count of the target class into the class-design-dependent field count table shown in FIG. 42. In doing this, the non-dependent field count is obtained by counting the dependent fields of the target class based on the generated class-design-dependent field offset table, including dependent fields which are inherited from other classes (step S404). Control then moves to step S109.

Operation of Instruction Conversion Unit 14

The instruction conversion performed by the instruction conversion unit 14 of the program execution system 2 in step S110a will be described in detail with reference to the flowchart shown in FIG. 47.

Figure 27:
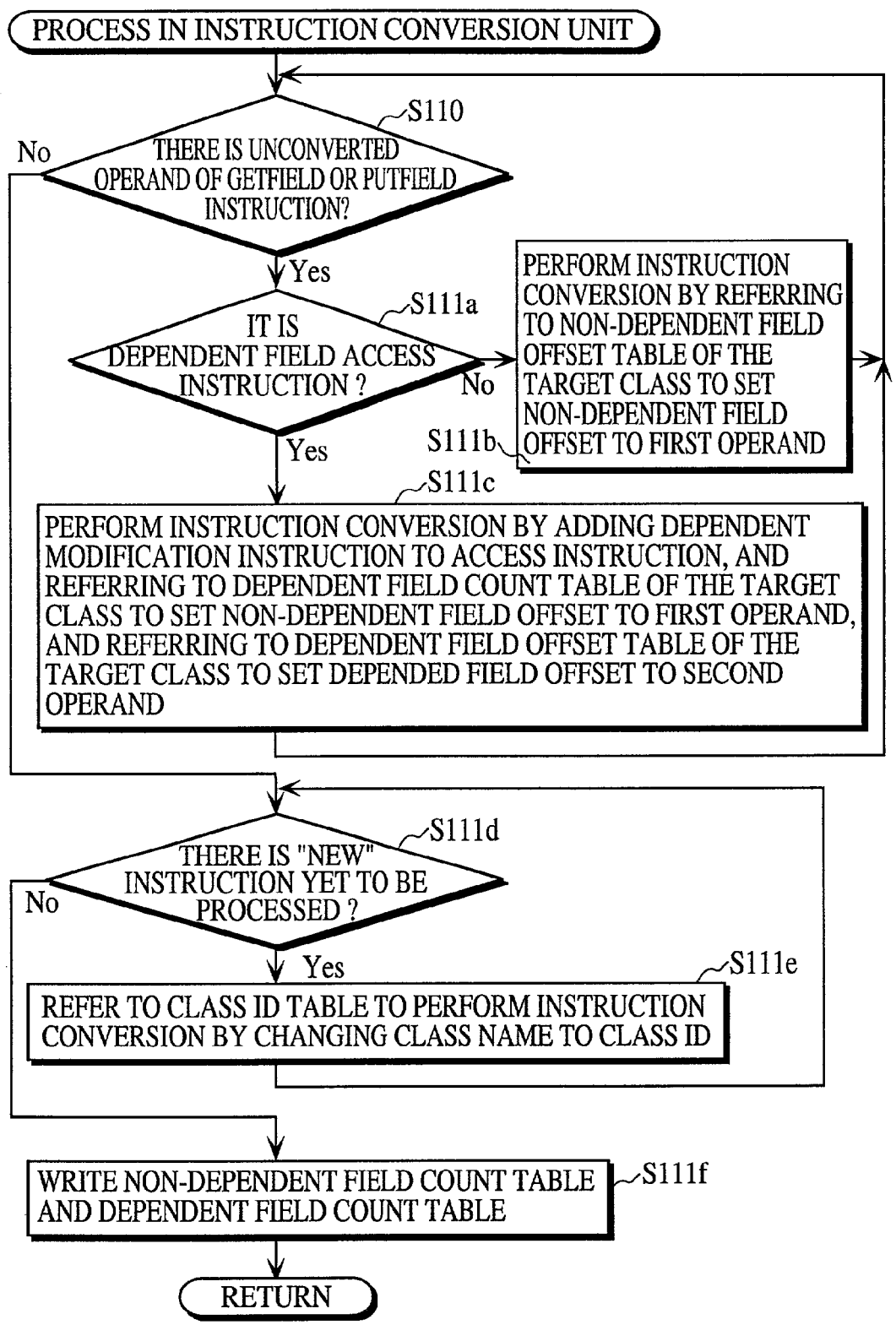
FIG. 27 is a flowchart showing a detailed procedure of instruction conversion.
Figure 47:
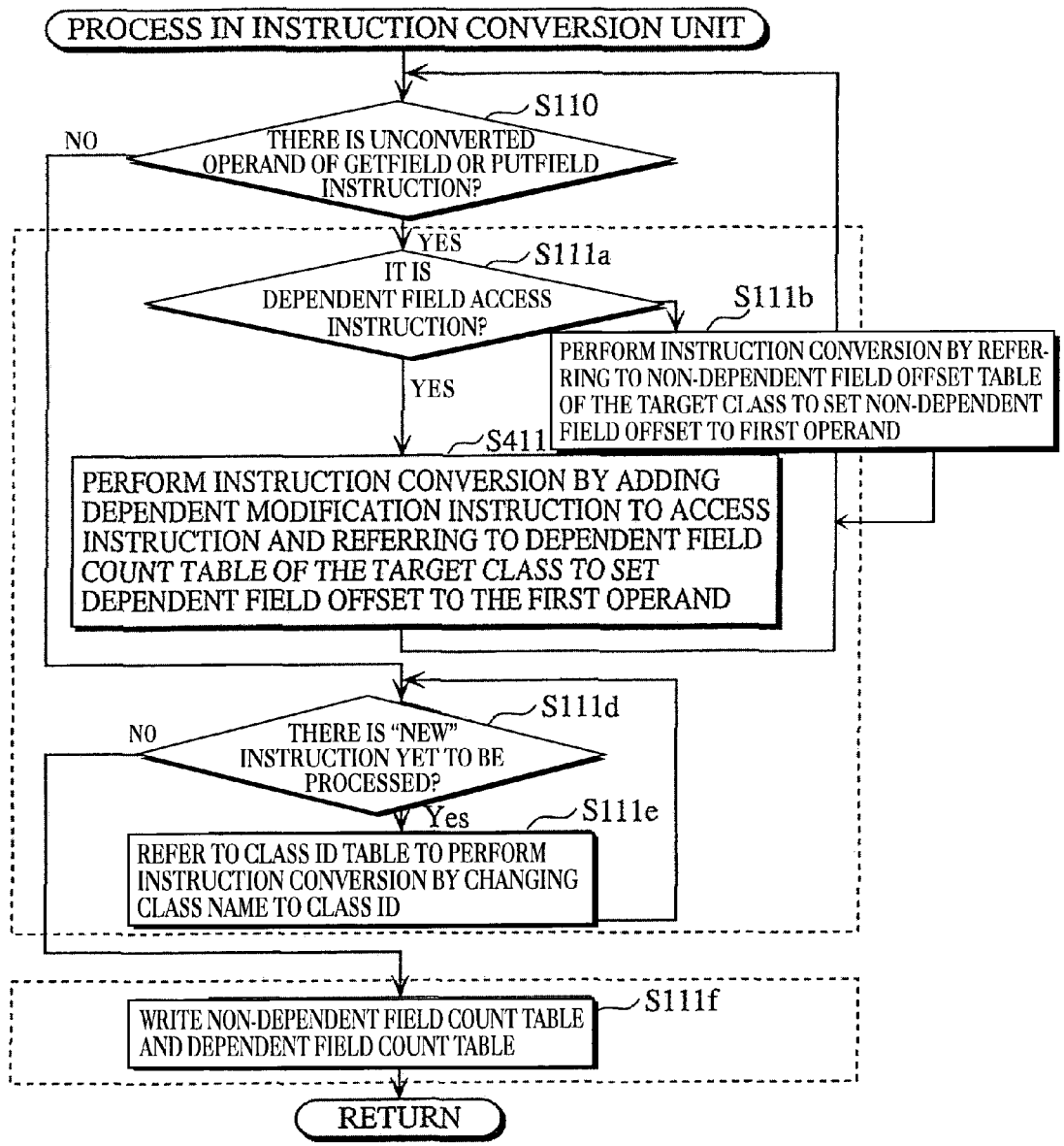
FIG. 47 is a flowchart showing a detailed procedure of instruction conversion by the instruction conversion unit 14 in the program execution system 2 during linkage to base class files.

The steps in FIG. 47 having the same numbers as the flowchart shown in FIG. 27 will not be explained here since the same operations are performed in these steps.

After step S111a is completed, the instruction conversion unit 14, in step S411, performs the instruction conversion by adding the dependent modification instruction to the access instruction, and referring to the dependent field count table of the target class to set the non-depended field offset to the first operand. In this step, "putfield <Built_in_classY. privateY1>" shown in FIG. 44A is converted into "dependent putfield 4" as shown in FIG. 44B.

In step S111e, the instruction conversion unit 14 refers to the class ID table to perform the instruction conversion by changing the class name to the class ID. In this step, "new <Built_in_classY>" shown in FIG. 44A is converted into "new 2" as shown in FIG. 44B.

(2) Operation of Linkage to User Class File

The procedure for the linkage to the user class files will be described.

Operation of Offset Table Generation Unit 13

The offset table generation process performed by the offset table generation unit 13 of the program execution system 2 in step S205a will be described in detail using the flowchart shown in FIG. 48.

Figure 29:
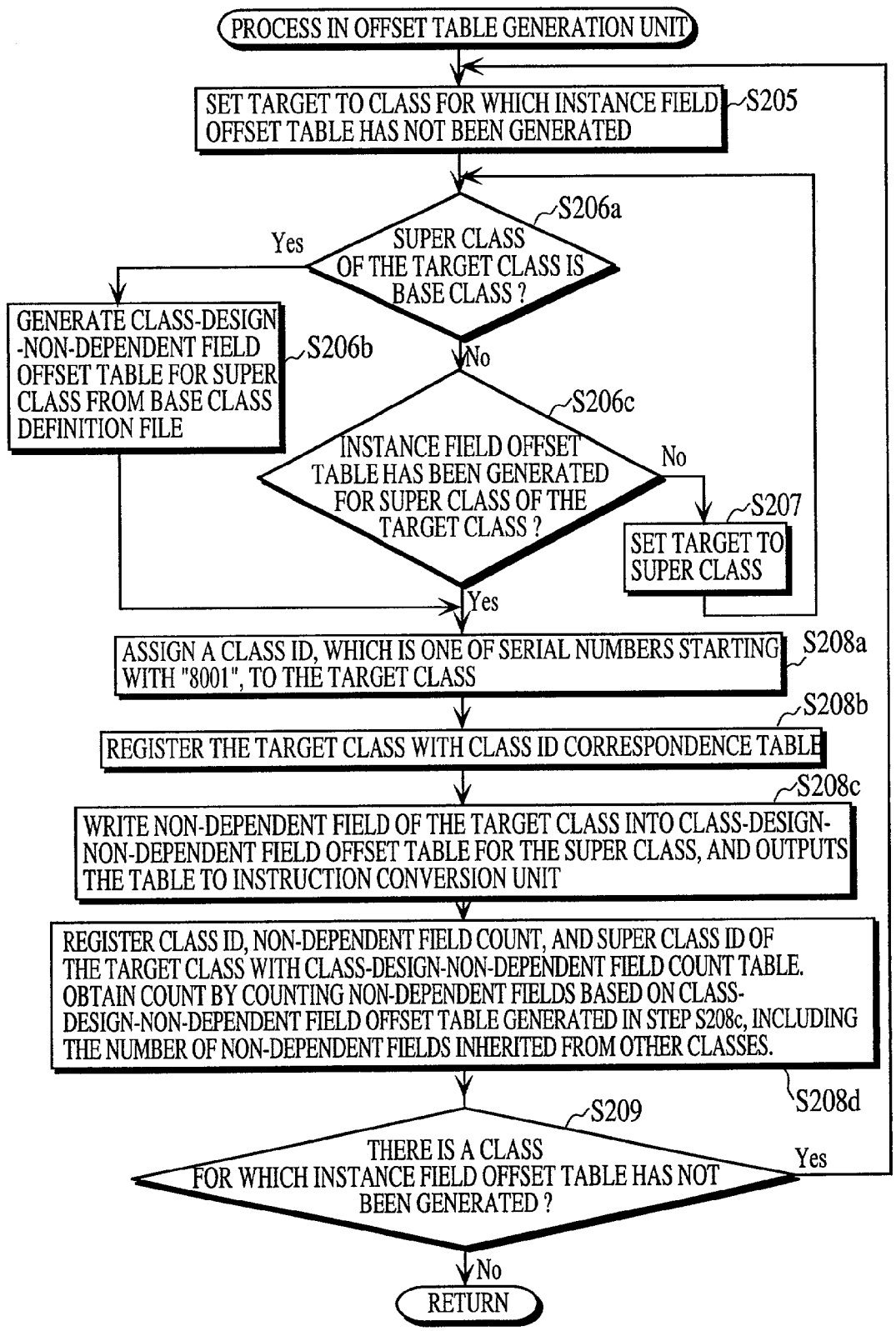
FIG. 29 is a flowchart showing a detailed procedure of offset table generation.
Figure 48:
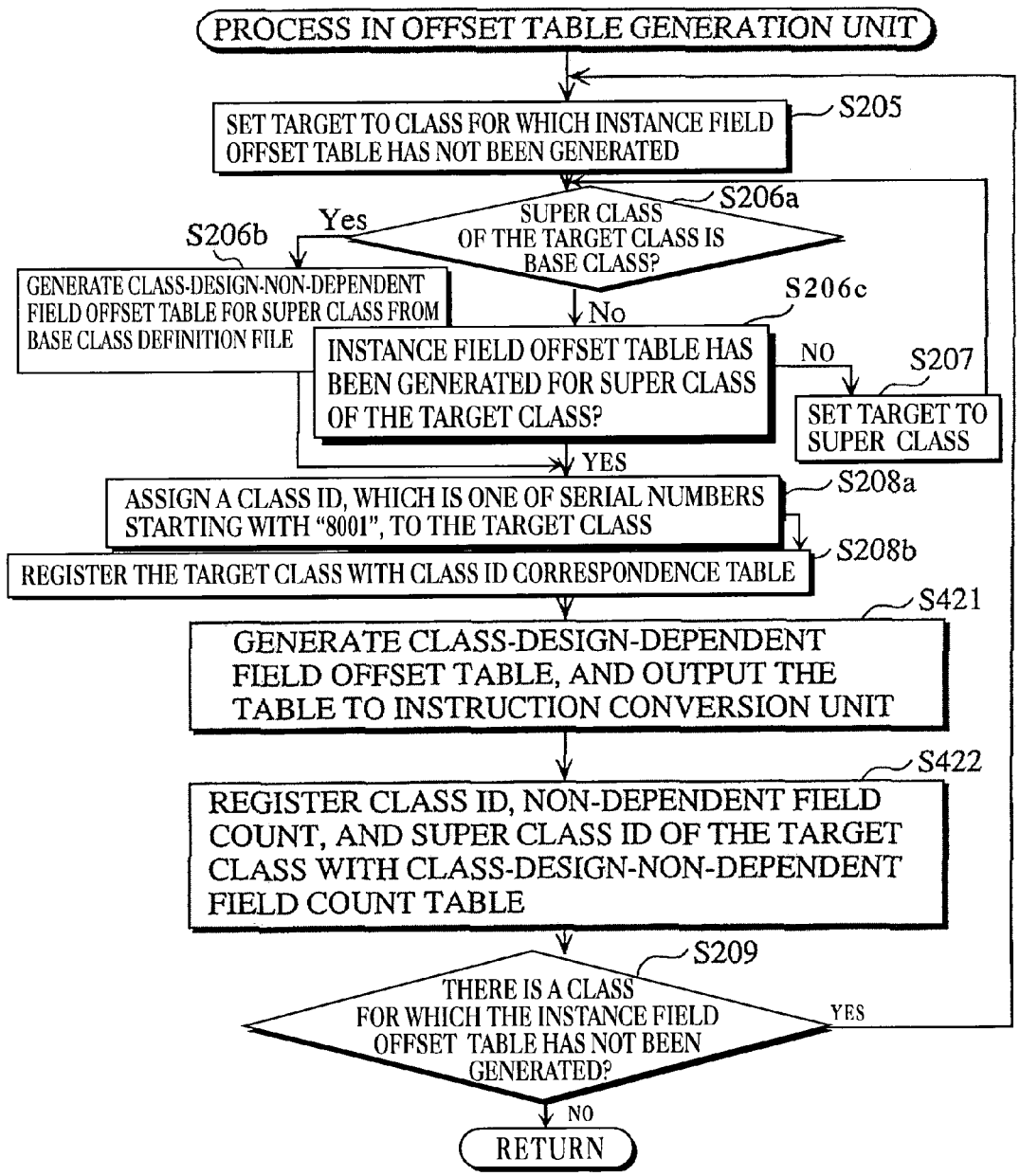
FIG. 48 is a flowchart showing a detailed procedure of offset table generation by the offset table generation unit 13 in the program execution system 2 during linkage to user class files.

The steps in FIG. 48 having the same numbers as the flowchart shown in FIG. 29 will not be explained here since the same operations are performed in these steps.

After step S208b is completed, the offset table generation unit 13 generates the class-design-non-dependent field offset table shown in FIG. 39, and outputs the table to the instruction conversion unit 14 (step S421).

The offset table generation unit 13 then writes the class ID, non-dependent field count, and super class ID of the target class into the class-design-non-dependent field count table shown in FIG. 43 (step S422).

After step S422 is completed, control moves to step S209.

Operation of Instruction Conversion Unit 14

The instruction conversion performed by the instruction conversion unit 14 of the program execution system 2 in step S210a will be described in detail with reference to the flowchart shown in FIG. 49.

Figure 30:
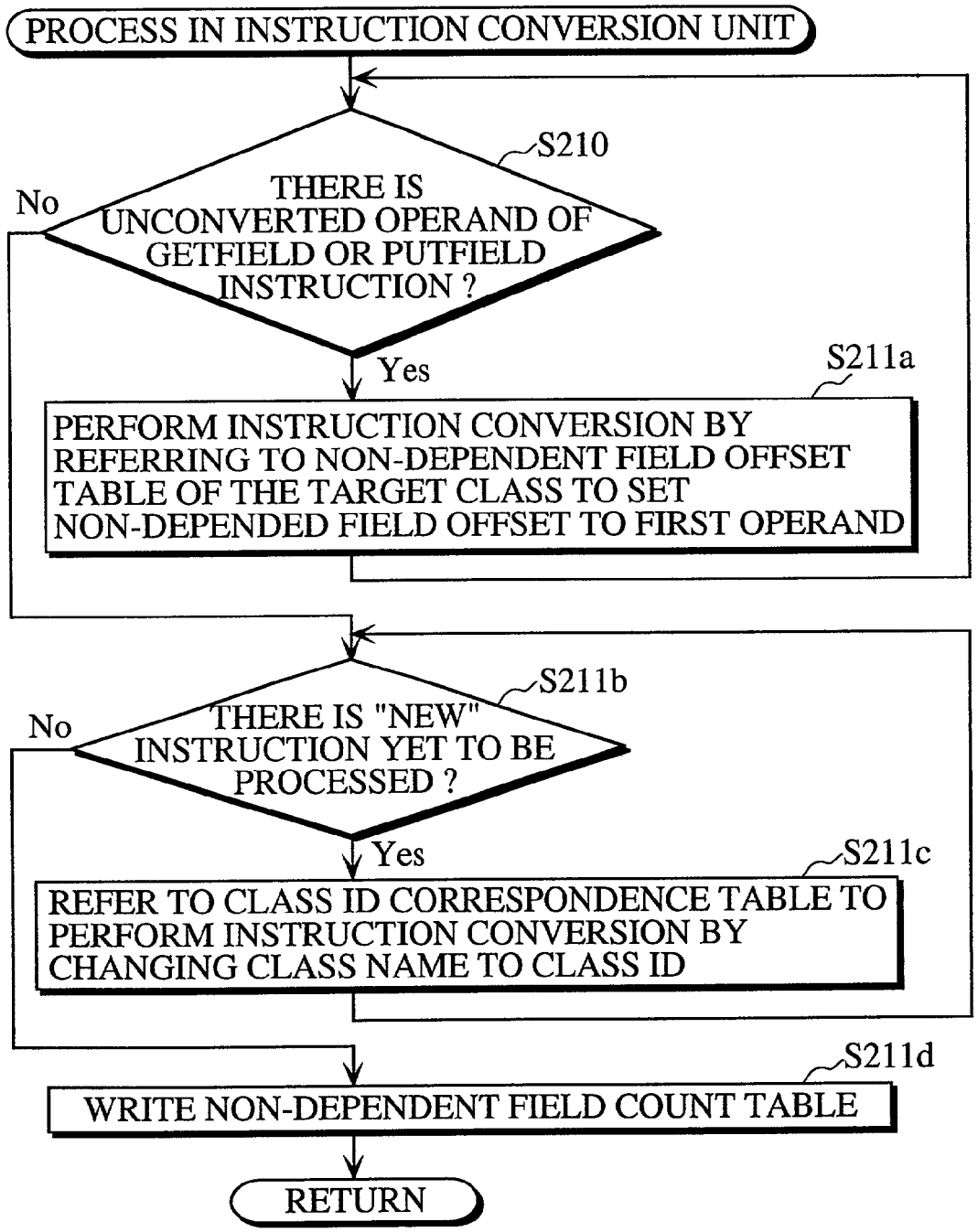
FIG. 30 is a flowchart showing a detailed procedure of instruction conversion.
Figure 49:
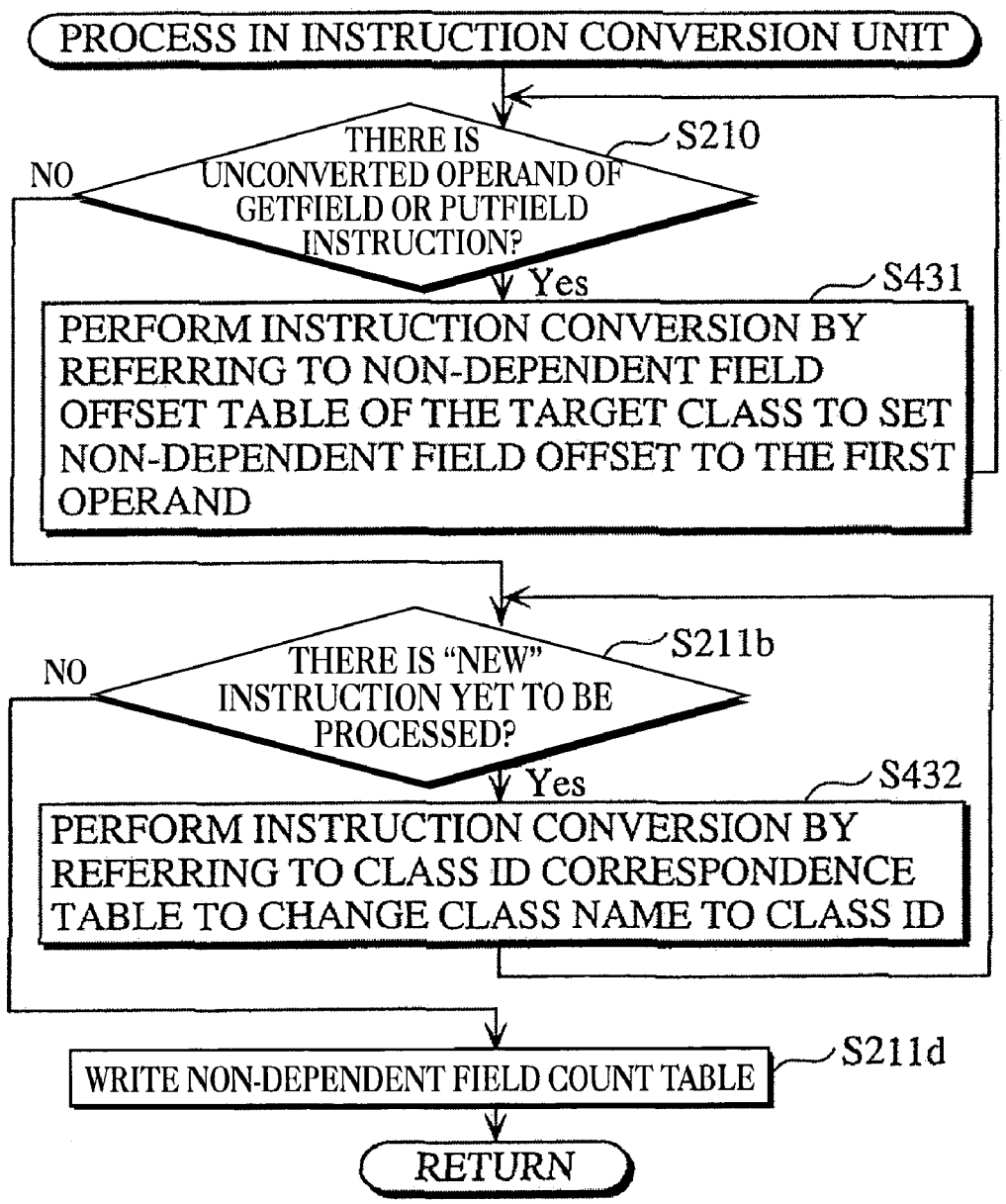
FIG. 49 is a flowchart showing a detailed procedure of instruction conversion by the instruction conversion unit 14 in the program execution system 2 during linkage to user class files.

The steps in FIG. 49 having the same numbers as the flowchart shown in FIG. 30 will not be explained here since the same operations are performed in these steps.

When judging positively in step S210, the instruction conversion unit 14 performs the instruction conversion by referring to the non-dependent field offset table of the target class to set the non-depended field offset to the first operand (step S431). In this step, "putfield <User_class.fieldU1>" shown in FIG. 45A is converted into "putfield 7" as shown in FIG. 45B. Control then returns to step S210 to repeat the steps.

When judging positively in step S211b, the instruction conversion unit 14 performs the instruction conversion by referring to the class ID correspondence table to change the class name to the class ID (step S432). In this step, "new <User_class>" shown in FIG. 45A is converted into "new 8001" as shown in FIG. 45B. Control then returns to step S211b to repeat the steps.

(3) Operation of Instruction Execution by Terminal Apparatus 20

The procedure for the instruction execution process performed by the terminal apparatus 20 will be described using the flowcharts shown in FIGS. 50 and 51.

Figure 31:
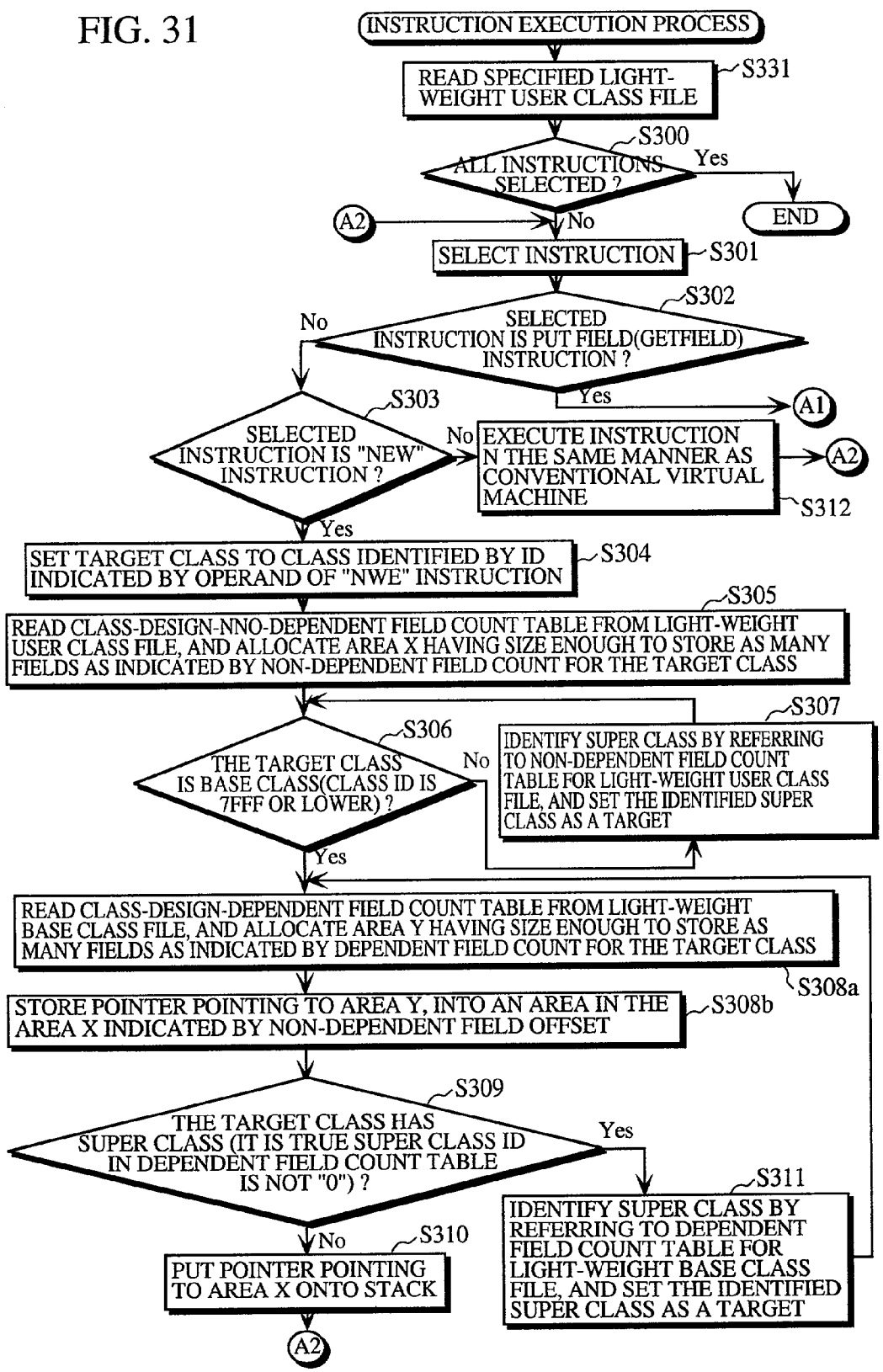
FIG. 31 is a flowchart showing the procedure of instruction execution in terminal apparatus 20, continuing to FIG. 32.
Figure 32:
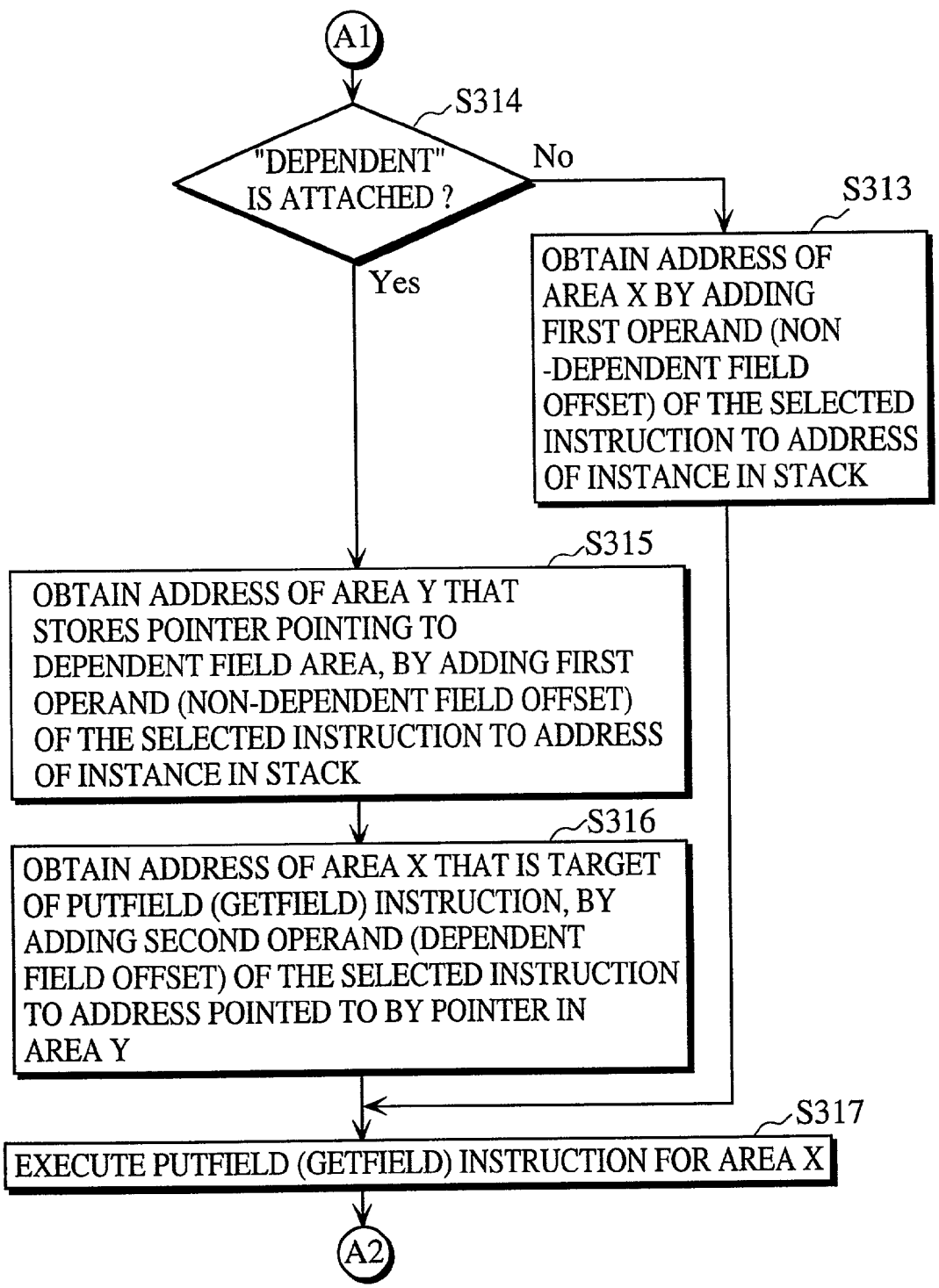
FIG. 32 is a flowchart showing the procedure of instruction execution in terminal apparatus 20, a continuation from FIG. 31.
Figure 50:
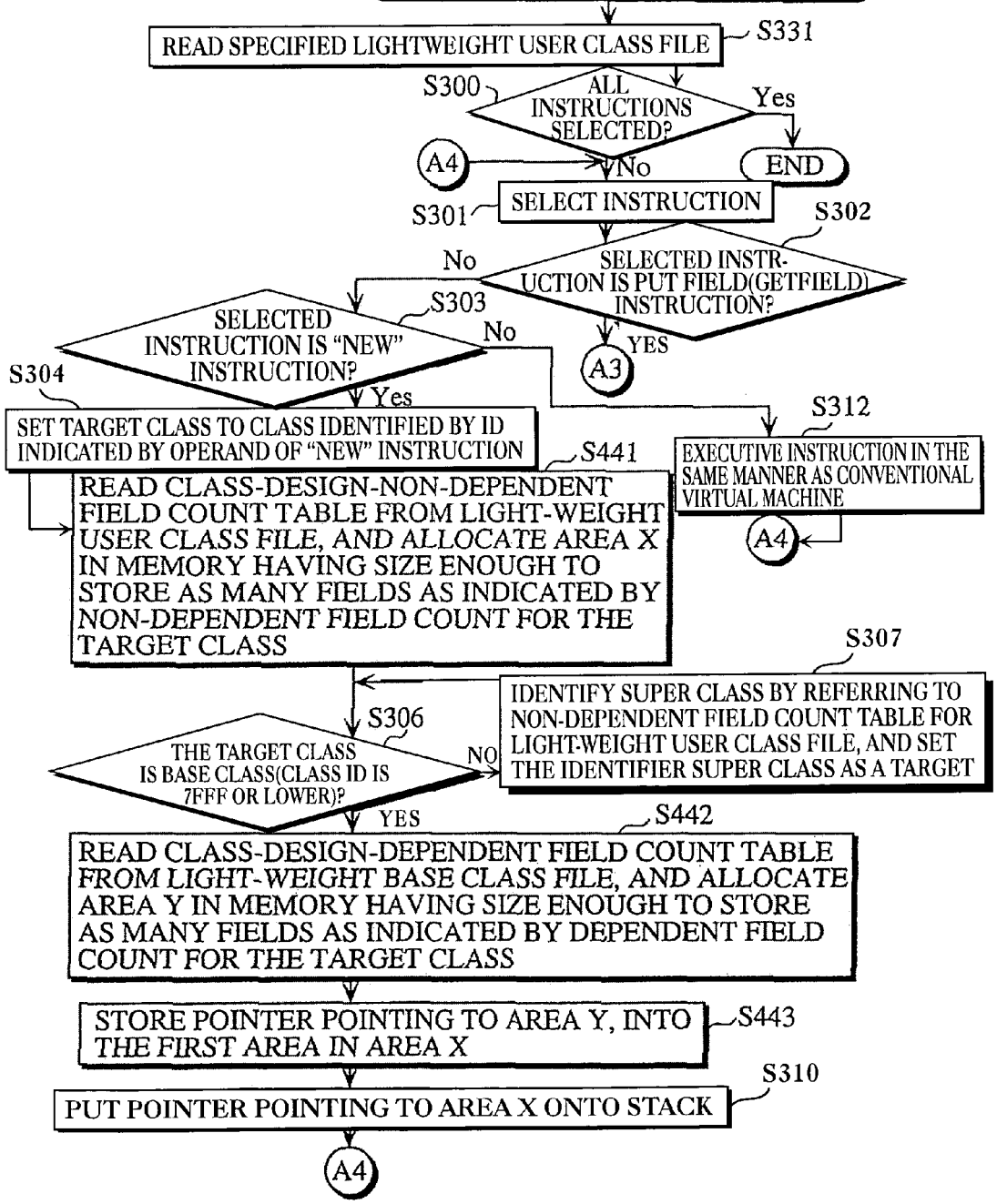
FIG. 50 is a flowchart showing the procedure of instruction execution process performed by the terminal apparatus 20, continuing to FIG. 51.
Figure 51:
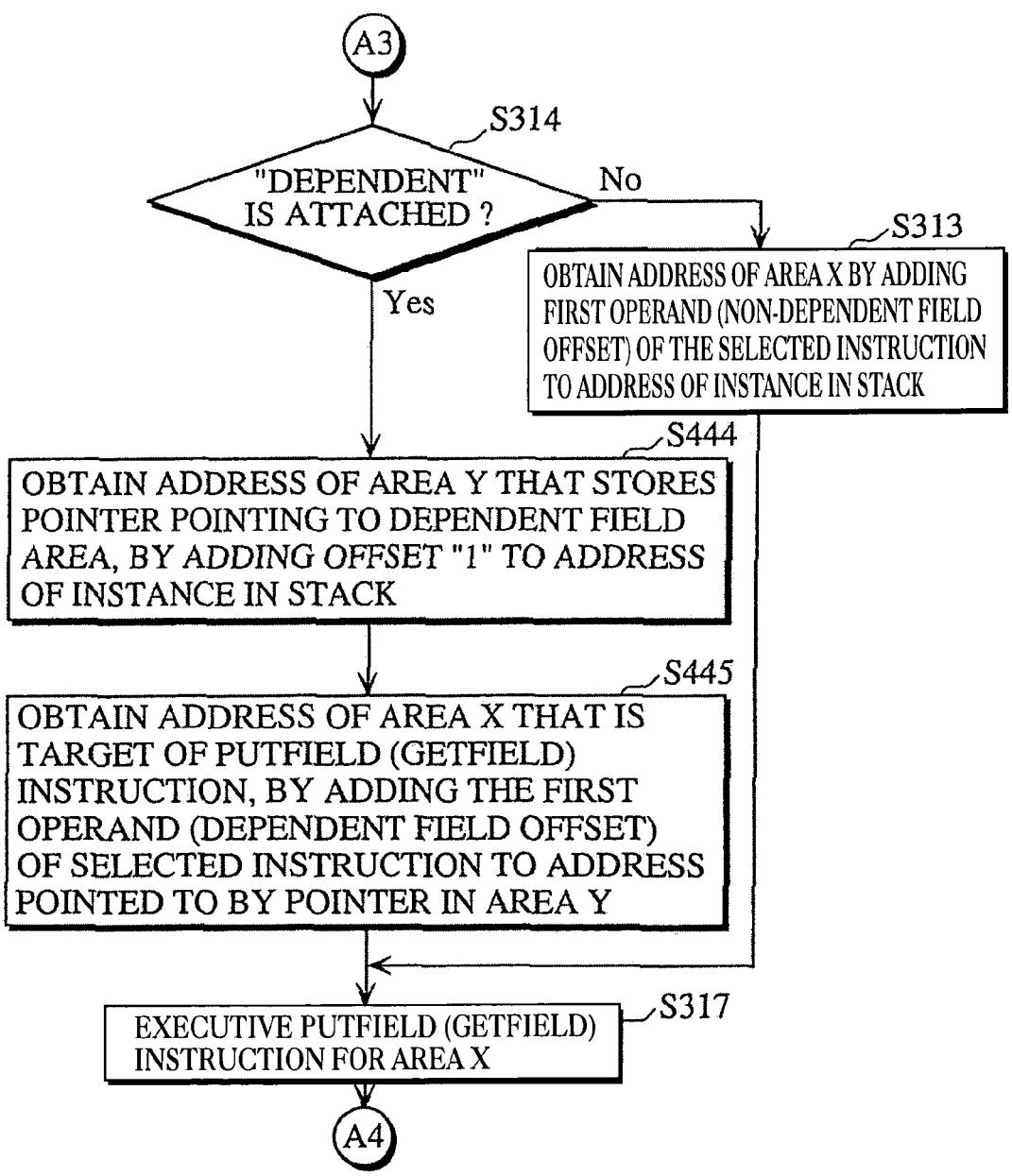
FIG. 51 is a flowchart showing the procedure of instruction execution process performed by the terminal apparatus 20, a continuation from FIG. 50.

The steps in FIG. 50 having the same numbers as the flowchart shown in FIG. 31 will not be explained here since the same operations are performed in these steps. Also, the steps in FIG. 51 having the same numbers as the flowchart shown in FIG. 32 will not be explained here since the same operations are performed in these steps.

After step S304 is completed, the instruction generation unit 22 reads the class-design-non-dependent field count table from the light-weight user class file, and allocates an area X in a memory having a size enough to store as many fields as indicated by the non-dependent field count for the target class (step S441). An example of the allocated area X in the memory is shown in FIG. 40A, indicated by the reference sign "721". After this step, control moves to step S306.

When the target class is a base class ("Yes" in step S306), the instance generation unit 22 reads the class-design-dependent field count table from the light-weight base class file, and allocates an area Y in a memory having a size enough to store as many fields as indicated by the dependent field count for the target class (step S442), and stores the pointer pointing to the area Y, into the first area in the area X (step S443). The relationship between area X and area Y is shown in FIG. 40A. In FIG. 40A, the sign "721" indicates the area X, and the sign "722" indicates the area Y. Control then moves to step S310.

When judging positively in step S314, the instruction execution unit 21 obtains the address of area Y that stores a pointer pointing to a dependent field area, by adding offset "1" to an address of an instance in a stack (step S444). The instruction execution unit 21 then obtains the address of area X that is a target of the putfield (getfield) instruction, by adding the first operand (a dependent field offset) of the selected instruction to an address pointed to by the pointer in the area Y (step S445).

Control then moves to step S317.

2.3 Brief Account

Terminal apparatuses A and B generate the instances shown in FIGS. 40A and 40B. As a result, both terminal apparatuses A and B can access "fieldU1" of the user class User_class as the $7^{th}$ variable in the instance area.

As described above, as is the case with the program execution system 1, the program execution system 2 is suitable for low-performance terminal apparatuses such as a computer-integrated system. Also, the use of the same light-weight user class file in a plurality of terminal apparatuses reduces the load on the program developers.

The variations applied to the program execution system 1, such as changing the position of the pointer area in the class-design-dependent field offset table from the start to the last, can also applied to the program execution system 2.

3. Third Embodiment

The program execution system 3 will be described as the third embodiment of the present invention.

The program execution system 3 has the same construction and operates the same as the program execution system 1 except for the construction of the class-design-non-dependent field offset table and the class-design-dependent field offset table, and the operation related to this change in the construction.

Note that in the following description, as is the case with the conventional program execution system, it is supposed that the Java programs shown in FIGS. 1 to 3 are used via compilation.

FIG. 52 shows two class-design-non-dependent field offset tables that are generated in the program execution system 3 to correspond to base classes. FIGS. 53A and 53B show instance field offset tables corresponding to the base classes.

In the program execution system 3, the maximum number of class-design-dependent fields to be included in the base class files is determined in advance. Designers design the base class files so that the number of class-design-dependent fields does not exceed the maximum number. The base class definition file includes only information concerning the maximum number of fixed-length class-design-dependent fields. It is supposed here that the maximum number of class-design-dependent fields is "5", for example.

The program execution system 3 generates a non-dependent field count for each class, where the non-dependent field count indicates the number of non-dependent fields included in a class. The program execution system 3 then adds up, for each class, the non-dependent field count, a dependent field count being a fixed value, and a field count of a class which is inherited by the present class, generates a count table including the sum, and writes the generated count table to the light-weight class file.

Unlike the program execution system 1 or 2, the program execution system 3 does not newly generate class-design-dependent field count tables, but generate instance field offset tables by adding information concerning class-design-dependent fields to the class-design-non-dependent field offset tables. In the program execution system 3, a count table is generated, and a light-weight class file including the count table is transferred from the program generation apparatus 10 to the terminal apparatus 20.

As shown in the class-design-non-dependent field offset table for the base class Built_in_classX in FIG. 52, offset numbers "1" and "2" are assigned to the class-design-non-dependent fields "fieldX1" and "fieldX2", respectively, in the order of definition. Also, offset numbers "3" to "7" are assigned to the class-design-dependent fields.

As shown in the class-design-non-dependent field offset table for the base class Built_in_classY in FIG. 52, offset numbers "1" and "2" are assigned to the class-design-non-dependent fields "fieldX1" and "fieldX2" that are inherited from the base class Built_in_classX, offset numbers "8", "9", and "10" are assigned to the class-design-non-dependent fields "fieldY1", "fieldY2", and "fieldY3" that are newly defined, and offset numbers "3" to "7" and "11" to "15" are assigned to the class-design-dependent fields.

The instance field offset tables for the terminal apparatuses A and B shown in FIGS. 53A and 53B are generated by adding the information concerning the class-design-dependent fields to the above-described class-design-non-dependent field offset tables.

FIG. 54 shows an instance field offset table generated in correspondence to the user class User_class shown in FIG. 3. FIGS. 55A and 55B show instances of the user classes User_class generated by the terminal apparatuses A and B.

In the program execution system 3, since the maximum number of class-design-dependent fields for use in each terminal apparatus is determined in advance, the instance field offset table for the user class User_class, as shown in FIG. 54, is used by both the terminal apparatuses A and B, and the light-weight user class file including the instance field offset table is also used by both terminal apparatuses A and B.

Actually, the terminal apparatuses A and B generate the instances shown in FIGS. 55A and 55B, respectively according to the instance field offset tables corresponding to the base classes and user classes (note that the instance field offset table shows relationships between the instance field types and offset numbers). More specifically, the terminal apparatuses A and B generate fixed-length instances. In FIGS. 55A and 55B, the instance includes 17 instance fields. The terminal apparatuses A and B secure each dependent instance field in the instance. The terminal apparatuses A and B read the count for each class from the light-weight class file, and secure as many instance fields as the read count for each class. As a result, both terminal apparatuses A and B can access "fieldU1" of the user class User_class as the $16^{th}$ variable.

As described above, as is the case with the program execution system 1, the program execution system 3 is suitable for low-performance terminal apparatuses such as a computer-integrated system. Also, the use of the same light-weight user class file in a plurality of terminal apparatuses reduces the load on the program developers. Furthermore, since terminal apparatuses can keep on using conventional class files, a program execution system for reducing the load on the program developers can easily been installed.

In the program execution system 3 of the present embodiment, the base class definition file includes only information concerning the maximum number of class-design-dependent fields. However, the base class definition file may include information concerning other instance fields.

4. Other Variations

Up to now, the present invention has been described through its embodiments. The present invention, however, is not limited to the above embodiments, and include the following variations.

(1) The present invention may be a method for achieving the above functions, or a computer program for allowing a computer to achieve the method, or a digital signal composed of the computer program.

The present invention may be a computer-readable record medium (e.g., a floppy disk, a hard disk, a CD-ROM, an MO, a DVD, a DVD-ROM, a DVD-RAM, or a semiconductor memory) recording the computer program or the digital signal. The present invention may be the computer program or the digital signal recorded in such a record medium.

The present invention may be the computer program or the digital signal transferred via a network such as an electric communication line, a radio or wired communication line, or the Internet.

The present invention may be a computer system having a microprocessor and a memory, where the memory prestores the computer program, and the microprocessor operates according to the computer program.

The computer program or the digital signal may be executed in another independent computer system by recording the computer program or the digital signal in the record medium and transferring the record medium to the other computer system, or by transferring the computer program or the digital signal via the above network to the other computer system.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A program generation apparatus for generating a plurality of light-weight class files for each terminal apparatus by linking a plurality of class files for each terminal apparatus, the program generation apparatus comprising:
   a storage means for prestoring the plurality of class files for each terminal apparatus, wherein each class defines (a) dependent variables unique to each terminal apparatus and (b) non-dependent variables common to all the plurality of terminal apparatuses, each variable is identified by a variable name, and each class file includes a variable name for each variable;
   an assignment means for, when a plurality of class files are linked for a terminal apparatus in relation to other terminal apparatuses, assigning an offset number to each variable defined in the plurality of class files so that the same offset numbers are assigned to non-dependent variables having the same variable names for the other terminal apparatuses; and
   a generation means for generating the plurality of light-weight class files for each terminal apparatus by replacing each variable name in each class file with an offset number assigned by the assignment means.

2. The program generation apparatus of claim 1, wherein the assignment means assigns an offset number to each variable using different numbering systems for dependent variables and non-dependent variables.

3. The program generation apparatus of claim 2, wherein the generation means further generates a non-dependent variable count and a dependent variable count for each class and adds to each light-weight class file the generated non-dependent variable count and the generated dependent variable count which indicate the number of non-dependent variables and the number of dependent variables included in a class, respectively.

4. The program generation apparatus of claim 2, wherein the plurality of classes include a first class and a second class which inherits the first class, and
the assignment means assigns an offset number to each variable using, in terms of the second class, different numbering systems for (a) dependent variables defined only in the second class and (b) dependent variables defined in the first class inherited by the second class.

5. The program generation apparatus of claim 4, wherein the generation means further generates a non-dependent variable count and a dependent variable count for each class and adds to each light-weight class file the generated non-dependent variable count and the generated dependent variable count which indicate the number of non-dependent variables and the number of dependent variables included in a class, respectively.

6. The program generation apparatus of claim 2, wherein the plurality of classes include a first class and a second class which inherits the first class, and
the assignment means assigns an offset number to each variable using, in terms of the second class, one numbering system for (a) dependent variables defined only in the second class and (b) dependent variables defined in the first class inherited by the second class.

7. The program generation apparatus of claim 6, wherein the generation means further generates a non-dependent variable count and a dependent variable count for each class and adds to each light-weight class file the generated non-dependent variable count and the generated dependent variable count which indicate the number of non-dependent variables and the number of dependent variables included in a class, respectively.

8. The program generation apparatus of claim 1, wherein the plurality of classes include a first class and a second class which inherits the first class, and
the number assignment means assigns an offset number to each variable using one numbering system regardless of dependent variables or non-dependent variables, and provides, in terms of the second class, a predetermined space between (a) variables defined only in the second class and (b) variables defined in the first class inherited by the second class.

9. The program generation apparatus of claim 8, wherein the generation means further generates a non-dependent variable count for each class, and adds the non-dependent variable count to a dependent variable count being a fixed value to obtain a count, and adds the obtained count to each light-weight class file.

10. A virtual machine for operating according to a plurality of light-weight class files generated by the program generation apparatus defined in claim 1, comprising:
a storage means for prestoring the plurality of light-weight class files;
an instance generation means for reading the plurality of light-weight class files and generating an instance according to offset numbers for variables included in the plurality of light-weight class files; and
an execution means for executing instructions defined in the plurality of light-weight class files, using the generated instance.

11. A virtual machine for operating according to a plurality of light-weight class files generated by the program generation apparatus defined in claim 3, comprising:
a storage means for prestoring the plurality of light-weight class files;
an instance generation means for generating an instance by (a) reading the plurality of light-weight class files, (b) allocating a first area and a second area in a memory based on, respectively, non-dependent variable counts and dependent variable counts generated for each class and included in the read light-weight class files, and (c) storing in the second area a pointer pointing to the first area; and
an execution means for executing instructions defined in the plurality of light-weight class files, using the generated instance.

12. A program generation method for use in a program generation apparatus which generates a plurality of light-weight class files for each terminal apparatus by linking a plurality of class files for each terminal apparatus, the program generation apparatus including
a storage means for prestoring the plurality of class files for each terminal apparatus, wherein each class defines (a) dependent variables unique to each terminal apparatus and (b) non-dependent variables common to all the plurality of terminal apparatuses, each variable is identified by a variable name, and each class file includes a variable name for each variable, and the program generation method comprising:
an assignment step for, when a plurality of class files are linked for a terminal apparatus in relation to other terminal apparatuses, assigning an offset number to each variable defined in the plurality of class files so that the same offset numbers are assigned to non-dependent variables having the same variable names for the other terminal apparatuses; and
a generation step for generating the plurality of light-weight class files for each terminal apparatus by replacing each variable name in each class file with an offset number assigned in the assignment step.

13. A computer-readable record medium recording a computer program for use in a computer which generates a plurality of light-weight class files for each terminal apparatus by linking a plurality of class files for each terminal apparatus, the computer including
a storage means for prestoring the plurality of class files for each terminal apparatus, wherein each class defines (a) dependent variables unique to each terminal apparatus and (b) non-dependent variables common to all the plurality of terminal apparatuses, each variable is identified by a variable name, and each class file includes a variable name for each variable, and the computer program comprising:
an assignment step for, when a plurality of class files are linked for a terminal apparatus in relation to other terminal apparatuses, assigning an offset number to each variable defined in the plurality of class files so that the same offset numbers are assigned to non-dependent variables having the same variable names for the other terminal apparatuses; and
a generation step for generating the plurality of light-weight class files for each terminal apparatus by replacing each variable name in each class file with an offset number assigned in the assignment step.

14. A program execution method for use in a virtual machine which operates according to a plurality of light-weight class files generated by the program generation apparatus defined in claim 1, the virtual machine including
a storage means for prestoring the plurality of light-weight class files, and the program execution method comprising:
an instance generation step for reading the plurality of light-weight class files and generating an instance according to offset numbers for variables included in the plurality of light-weight class files; and
an execution step for executing instructions defined in the plurality of light-weight class files, using the generated instance.

15. A computer-readable record medium recording a computer program for use in a virtual machine which operates according to a plurality of light-weight class files generated by the program generation apparatus defined in claim 1, the virtual machine including
a storage means for prestoring the plurality of light-weight class files, and the computer program comprising:
an instance generation step for reading the plurality of light-weight class files and generating an instance according to offset numbers for variables included in the plurality of light-weight class files; and
an execution step for executing instructions defined in the plurality of light-weight class files, using the generated instance.

16. A computer-readable record medium recording a plurality of light-weight class files generated by the program generation apparatus defined in claim 1.

17. A program generation apparatus comprising
a class file generation mechanism for generating a plurality of terminal specific class files, the plurality of terminal specific class files comprising at least one terminal specific class file for each terminal apparatus of a plurality of terminal apparatuses, from one or more input files comprising both terminal apparatus specific variables and terminal apparatus independent variables, and generating the plurality of terminal specific class files comprises replacing both terminal apparatus specific variables and terminal apparatus independent variables with offset values, wherein:
the offset value used to replace any particular terminal apparatus independent variable in a terminal specific class file is the same value that is used to replace the particular terminal apparatus independent variable in all the other terminal specific class files of the generated plurality of terminal specific class files.

* * * * *